(12) United States Patent
Minemura

(10) Patent No.: US 7,764,461 B2
(45) Date of Patent: Jul. 27, 2010

(54) CABLE CARRYING MECHANISM AND LIBRARY APPARATUS

(75) Inventor: Tsukasa Minemura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 411 days.

(21) Appl. No.: 11/277,826

(22) Filed: Mar. 29, 2006

(65) Prior Publication Data
US 2007/0139812 A1 Jun. 21, 2007

(30) Foreign Application Priority Data
Dec. 19, 2005 (JP) ............................. 2005-365064

(51) Int. Cl.
*G11B 15/68* (2006.01)
(52) U.S. Cl. .................................. 360/92.1
(58) Field of Classification Search ............... 360/92.1, 360/323, 264.2; 369/30.36; 720/685, 731; 187/413
See application file for complete search history.

(56) References Cited

U.S. PATENT DOCUMENTS

| | | | |
|---|---|---|---|
| 4,820,109 A | | 4/1989 | Witt |
| 4,923,053 A | * | 5/1990 | Daniels ........................ 187/413 |
| 5,237,468 A | * | 8/1993 | Ellis ........................... 360/92.1 |
| 6,073,261 A | * | 6/2000 | Miller ......................... 714/731 |
| 7,464,623 B2 | | 12/2008 | Okada et al. |
| 2001/0013990 A1 | * | 8/2001 | Ostwald et al. ............... 360/92 |
| 2002/0057520 A1 | * | 5/2002 | Collins et al. ................ 360/92 |
| 2003/0063411 A1 | * | 4/2003 | Ostwald ....................... 360/92 |
| 2004/0083655 A1 | | 5/2004 | Suzuki et al. |
| 2004/0233799 A1 | * | 11/2004 | Takahashi et al. ......... 369/30.36 |
| 2005/0072261 A1 | | 4/2005 | Okada et al. |
| 2005/0088783 A1 | * | 4/2005 | Zhou ........................ 360/264.2 |
| 2006/0098350 A1 | * | 5/2006 | Hamidi ....................... 360/323 |
| 2007/0067789 A1 | * | 3/2007 | Omori ........................ 720/685 |

FOREIGN PATENT DOCUMENTS

| | | |
|---|---|---|
| JP | 3-253216 | 11/1991 |
| JP | 4-156217 | 5/1992 |
| JP | 4-111231 | 9/1992 |
| JP | 5-228553 | 9/1993 |
| JP | 2004-142704 | 5/2004 |
| JP | 2005-111585 | 4/2005 |
| KR | 2003-0071315 | 9/2003 |

* cited by examiner

Primary Examiner—David D Davis
(74) Attorney, Agent, or Firm—Staas & Halsey LLP

(57) ABSTRACT

A cable carrying mechanism or library apparatus is configured to include a cable carrying unit (cable bearer) that is fixed at one end to a support unit (frame) supporting a movable unit (medium gripping mechanism unit) causing a positional displacement to carry a cable led by the movable unit while maintaining the cable bendable and a guide mechanism unit that is disposed in the movable unit to move the other end of the cable carrying unit within a predetermined range as well as to guide the movement thereof.

25 Claims, 22 Drawing Sheets

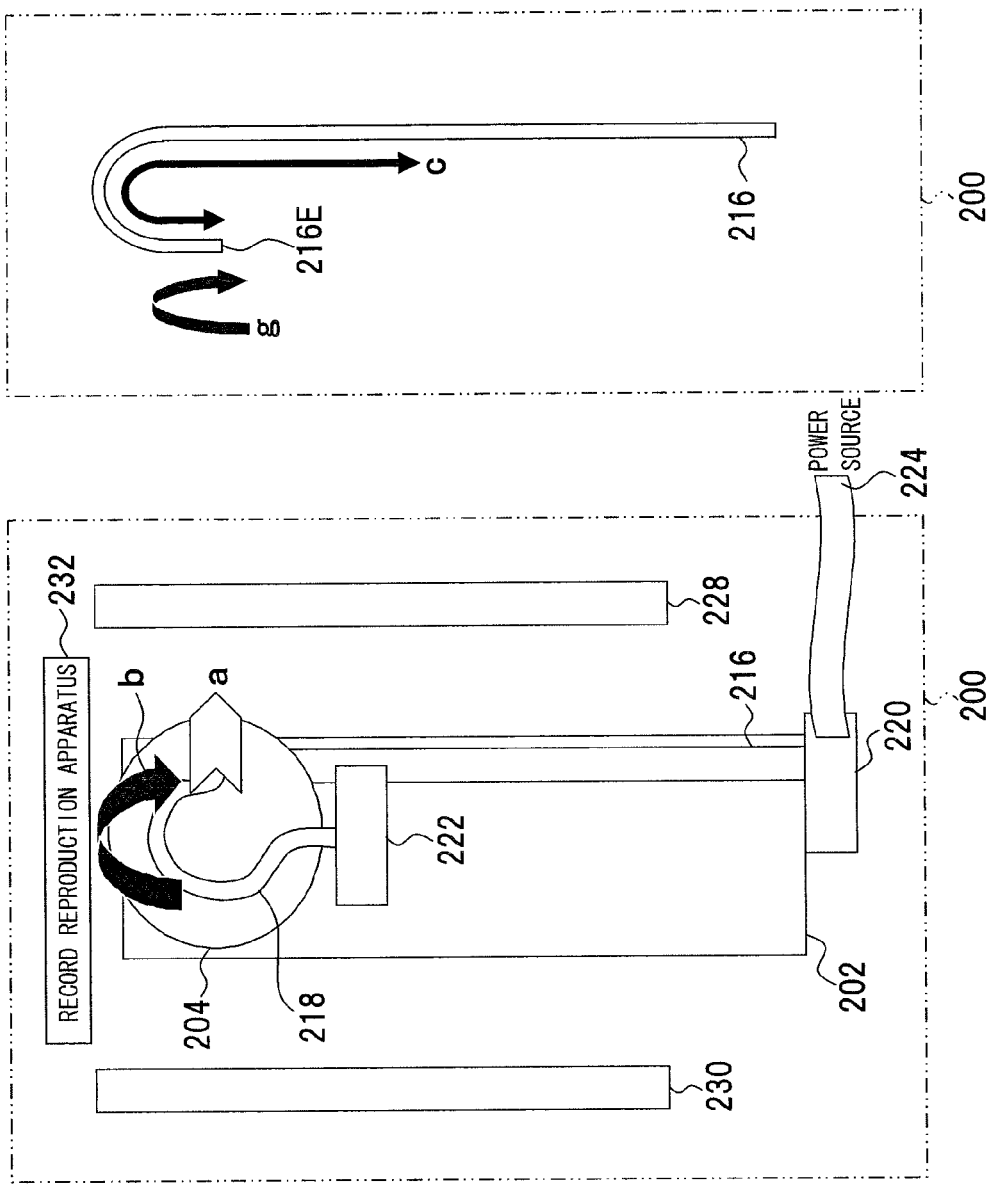

CABLE CARRYING MECHANISM AND LIBRARY APPARATUS

CROSS-REFERENCE TO RELATED APPLICATIONS

This application is based upon and claims the benefit of priority from the prior Japanese Patent Application No. 2005-365064, filed on Dec. 19, 2005, the entire contents of which are incorporated herein by reference.

BACKGROUND OF THE INVENTION

1. Field of the Invention

The present invention relates generally to cable carrying suited for a mechanism unit associated with mechanical displacement such as a carrying mechanism that carries a cartridge recording medium, and, more particularly, to a cable carrying mechanism and a library apparatus that protects a cable following positional displacement such as rotation.

2. Description of the Related Art

With regard to a library apparatus that stores a cartridge recording medium (hereinafter, "recording medium") storing a program, etc. and performs read/write of the recording medium, the library apparatus includes a storage shelf that stores the recording medium, a record reproduction apparatus that is used for recording into or reproduction from the recording medium, a medium transport mechanism that is used for delivery and transportation of the recording medium between the storage shelf and the record reproduction apparatus. The medium transport mechanism includes a gripping mechanism unit that grips and releases the recording medium, a mechanism unit that moves the position of the recording medium, etc., and each mechanism unit is equipped with a multiplicity of driving sources such as a motor that is supplied with electric power to generate a mechanical force. For the driving sources that should be supplied with electric power, a multiplicity of cables is needed for supplying electric power from outside or transmitting control signals; for the cable connected to the driving source mounted on a mechanism unit generating positional displacement, the length must allows for the movement of the mechanism unit; an extra length must be ensured for alleviating stress exerted by the positional displacement of the mechanism unit; and a position selected for disposing the cable is a space where the movement of the mechanism unit does not disturbed. If a plurality of mechanism units is tightly located or if the mechanism unit is adjacent to the wall of the apparatus, a space for disposing the cable is narrowed down and a degree of freedom is reduced in the cable disposition. If the cable poorly follows the movement of the mechanism unit, the cable is subjected to stress loading such as bending or twisting.

Such a cable apparatus includes a cable guide apparatus in a library apparatus that includes a two-section link between a turning member connected to a cable and a main body and that includes a guide unit on the link to guide the cable as the turning member turns (Japanese Patent Application Laid-Open Publication No. 04-156217) and a cable apparatus in an automatic die exchanging device performing turning, ascending and descending movement that can easily guide a cable following the rotation and the vertical movement because a cable between turning units and a vertical movement cable between ascending/descending units are included (Japanese Patent Application Laid-Open Publication No. 05-228553).

By the way, when a library apparatus is equipped with two medium transport mechanism units that deliver recording media between a storage shelf storing recording media and a record reproduction apparatus, a machine density (mounting efficiency) becomes high in the apparatus chassis; the medium transport mechanism units need a plurality of stop positions; and since a medium gripping mechanism unit gripping the recording medium has a rotational structure driven by a motor, a cable connected to each driving source is subjected to excessive stress due to the rotation.

To avoid such stress, as shown in FIG. 18, a library apparatus 200 includes a medium transport mechanism unit 202 for transporting a recording medium. On the medium transport mechanism unit 202, a medium gripping mechanism unit 204 is disposed for gripping the recording medium, and the medium gripping mechanism unit 204 is mounted on a rail unit 206 for horizontal movement and includes a swivel mechanism unit 208 for swiveling on the rail unit 206. On the medium gripping mechanism unit 204, flexible flat cables (FFC) 216, 218 and relay printed boards 220, 222 are disposed for feeding motors 210, 212, 214, etc. with electric power. Each FFC 216, 218 is formed by inserting about three cables; the FFC 216 is bent into a U shape; and the FFC 218 is disposed such that gaps between components are filled. The relay printed board 220 is used for relaying between horizontal movement (arrow X) and vertical movement (arrow Y), is connected to one end of the FFC 216, 218, and is connected to a FFC 224 for supplying power from outside. The relay printed board 222 relays the linear movement of the medium gripping mechanism unit 204 and the swiveling movement (arrow S) of the swivel mechanism unit 208 and is connected to one end of the FFC 216 and the other end of the FFC 218. On the medium gripping mechanism unit 204, a protective cover 226 is disposed for protecting the FFC 218, etc. The medium transport mechanism unit 202 swivels, for example, from a position shown in FIG. 19A to a position shown in FIG. 19B for gripping and transporting the recording medium.

To support the movement pattern and the movement direction of the movable units, the relay printed boards 220, 222 has been used for connecting the FFCs 216, 218, 224, and the FFCs 216, 218 has been protected by the arrangement such as the insertion or the direct protection using the protective cover 226.

Description will be made of the operation of the medium transport mechanism unit 202 of the library apparatus 200 and the behavior of the FFCs 216, 218 with reference to FIGS. 20A, 20B, 21A, 21B, 22A, and 22B. In FIGS. 20A to 22B, FIGS. 20A, 21A, and 22A are plan views of the library apparatus 200, and FIGS. 20B, 21B, and 22B are side views thereof.

When the medium transport mechanism unit 202 faces toward a record reproduction apparatus 232 from the front side of the library apparatus 200 as shown in FIG. 20A, the behavior of the FFCs 216, 218 is as shown in FIG. 20B.

The medium transport mechanism unit 202 is disposed at the center of the library apparatus 200, and a medium shelf 228 and a medium shelf 230 are disposed to the right and the left of the medium transport mechanism unit 202, respectively. In the medium transport mechanism unit 202, the FFC 216 is disposed from the front side of the library apparatus 200 toward the record reproduction apparatus 232, and the FFC 218 is disposed in the medium gripping mechanism unit 204. The FFC 218 is disposed in parallel with the swivel mechanism unit 208 described above.

In FIGS. 20A and 20B, an arrow a shows the movement of the medium gripping mechanism unit 204 and the direction thereof; an arrow b shows the movement direction of the medium gripping mechanism unit 204 and an end 216E of the FFC 216; an arrow c shows the movement direction of the FFC 216; an arrow d shows the clockwise turning of the medium gripping mechanism unit 204; an arrow e shows the anticlockwise turning of the medium gripping mechanism unit 204; and an arrow f shows the rotation of the FFC 218. In this case, since the medium gripping mechanism unit 204 is located at the front side of the library apparatus 200, the overlap portion of the FFC 216 becomes the longest.

When the medium transport mechanism unit 202 moves from the front side of the library apparatus 200 toward the record reproduction apparatus 232 and the medium gripping mechanism unit 204 faces toward the medium shelf 228 as shown in FIG. 21A, the behavior of the FFCs 216, 218 is as shown in FIG. 21B. An arrow g shows the rotation of the FFC 218.

When the medium transport mechanism unit 202 moves from the front side of the library apparatus 200 toward the record reproduction apparatus 232 and the medium gripping mechanism unit 204 faces toward the medium shelf 230 as shown in FIG. 22A, the behavior of the FFCs 216, 218 is as shown in FIG. 22B. In this case, arrows h, i show the behavior of the FFC 218, and the FFC 218 is double folded and is subjected to considerable bending stress.

When the FFCs are used, although the occupation of the disposition space can be alleviated, the considerable stress is concentrated by the movement. In the FFCs, the relay printed boards must be disposed to support the movement pattern of the movable units.

Japanese Patent Application Laid-Open Publication Nos. 04-156217 and 05-228553 do not disclose such problems and do not indicate or disclose the solutions thereof.

SUMMARY OF THE INVENTION

An object of the present invention relates to cable carrying and is to improve the performance of the cable following the movable unit that causes a positional displacement as well as to improve a protective function.

Another object of the present invention is to constrain the movement range of the cable associated with the movement of the movable unit that causes a positional displacement and is to reduce the range occupied by the cable.

In order to achieve the above objects, according to a first aspect of the present invention there is provided a cable carrying mechanism comprising a cable carrying unit that is fixed at its one end to a support unit supporting a movable unit causing a positional displacement to carry a cable led by the movable unit while maintaining the cable bendably; and a guide mechanism unit that is disposed in the movable unit to move the other end of the cable carrying unit within a predetermined range, the guide mechanism unit guiding the movement of the cable carrying unit.

In this configuration, the cable led by the movable unit is carried by the cable carrying unit. That is, the cable is led by the cable carrying unit from one end (fixed end) of the cable carrying unit, and the cable led out from other end (moving end) of the cable carrying unit is led by the movable unit. The moving end of the cable carrying unit is guided by the guide mechanism unit disposed on the movable unit and moves following the rotation and movement of the movable unit. This movement is restricted to the predetermined range by the guide mechanism unit. The objects of the present invention is achieved by such a configuration.

In the cable carrying mechanism, the cable carrying unit may include a cover unit that holds the cable by the cable's penetrating.

In the cable carrying mechanism, the guide mechanism unit may include a sliding unit that is fixed to a moving end of the cable carrying unit and a guide rail unit that restricts a movement range of the sliding unit, the guide rail unit guiding the movement of the sliding unit. According to such a configuration, the sliding unit attached to the guide rail unit can move freely. Therefore, the moving end of the cable carrying unit can be moved following the rotation and movement of the movable unit.

In the cable carrying unit in the cable carrying mechanism, the other end may be moved by the guide mechanism unit due to the rotation or movement of the movable unit, and a curvature radius changes.

In the cable carrying mechanism, the cable carrying unit may have a length maintaining an extra length portion of the cable necessary for the rotation or movement of the movable unit. According to such a configuration, even when the cable carrying unit is moved following the rotation or movement of the movable unit, the stress on the cable is not concentrated.

In the cable carrying mechanism, the movable unit may include a power supplied unit that is connected to the cable to be supplied with electric power.

To achieve the above objects, according to a second aspect of the present invention there is provided a library apparatus comprising a movable unit that causes a positional displacement; a cable carrying unit that is fixed at its one end to a support unit supporting the movable unit to carry a cable led by the movable unit while maintaining the cable bendably; and a guide mechanism unit that is disposed in the movable unit to move the other end of the cable carrying unit within a predetermined range, the guide mechanism unit guiding the movement of the cable carrying unit. By virtue of such a configuration, in the library apparatus, the cable can be moved following the rotation and movement of the movable unit, thus achieving the above objects.

In the library apparatus, the movable unit may include a gripping mechanism unit that grips a recording medium.

To achieve the above objects, in the library apparatus: the movable unit may be rotated by a rotation mechanism of a main body of the apparatus; the movable unit may be mounted on a rail unit disposed in a movement space that is disposed on the front side of the storage shelf storing a recording medium; the cable carrying unit may include a cover unit that holds the cable by the cable's penetrating; the other end of the cable carrying unit may be moved by the guide mechanism unit due to the rotation or movement of the movable unit and a curvature radius changes; the cable carrying unit may have a length including an extra length portion of the cable necessary for the rotation or movement of the movable unit; the library apparatus may include a storage shelf that stores a recording medium, a record reproduction apparatus that uses the recording medium to perform recording or reproducing, a movement mechanism unit that moves with the movable unit mounted, and a delivery mechanism unit that is disposed on the movable unit to deliver the recording medium to/from the storage shelf or the record reproduction apparatus; and the movable unit may include a power supplied unit that is connected to the cable to be supplied with electric power.

The features and advantages of the present invention are listed as follows.

(1) With regard to the cable carrying unit that carries the cable led by the movable unit while maintaining the cable flexible, since the guide mechanism unit can make one end of the cable carrying unit follow the movement of the movable unit, the cable can be protected in a small footprint.

(2) According to such a cable carrying mechanism, the cable can be prevented from being damaged during assembly operation and from being damaged by the movement of the movable unit.

(3) According to the library apparatus using such a cable carrying mechanism, the cable can be protected in a small footprint and a highly safe apparatus can be provided.

Other objects, features, and advantages of the present invention will become more apparent with reference to the accompanying drawings and the embodiments.

BRIEF DESCRIPTION OF THE DRAWINGS

FIGS. 21A and 21B show the operation and behavior of the medium transport mechanism unit.

DETAILED DESCRIPTION OF THE PREFERRED EMBODIMENTS

Figure 1:
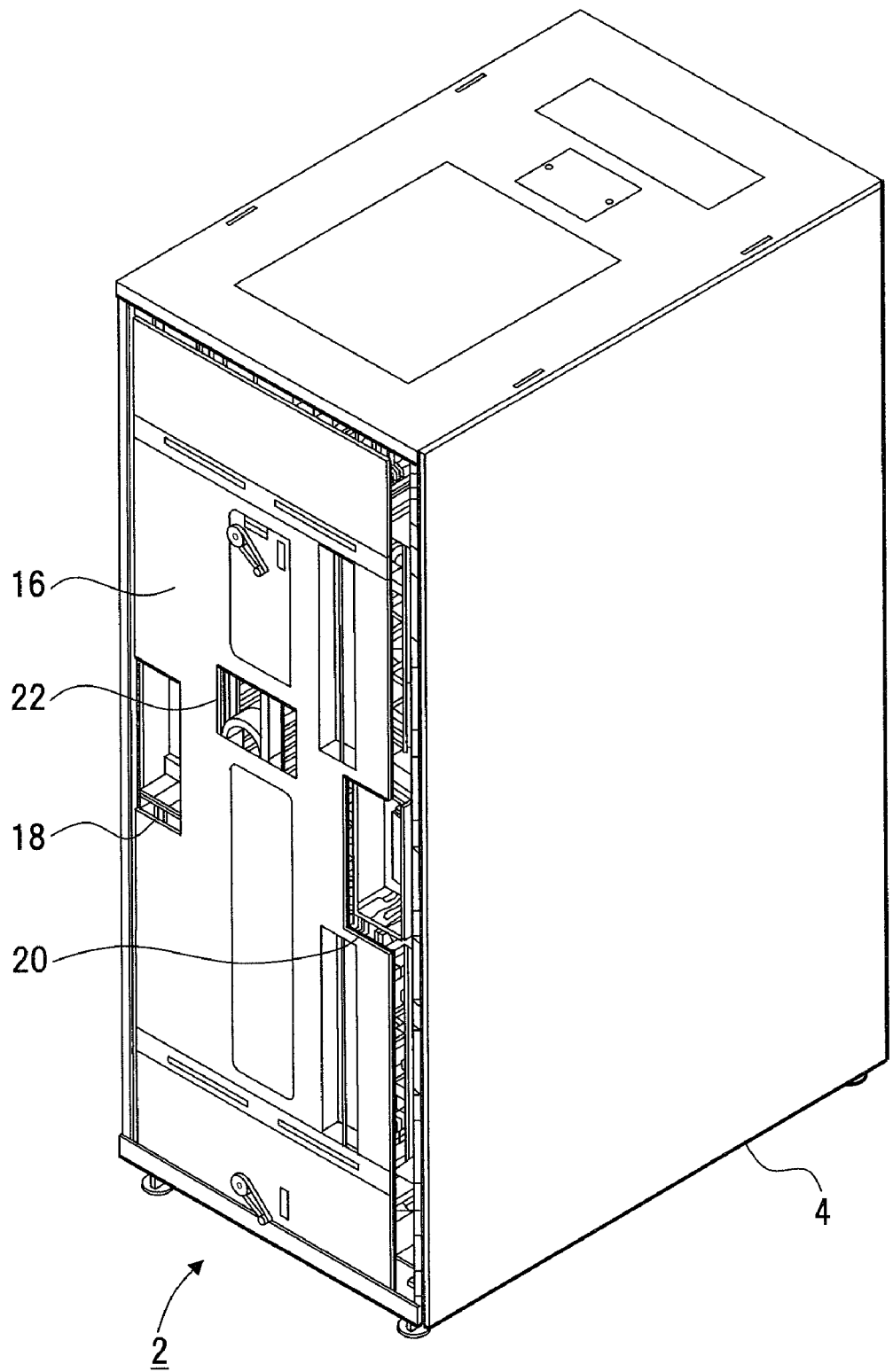
FIG. 1 is a perspective view of an example of a library apparatus according to an embodiment of the present invention.
Figure 2:
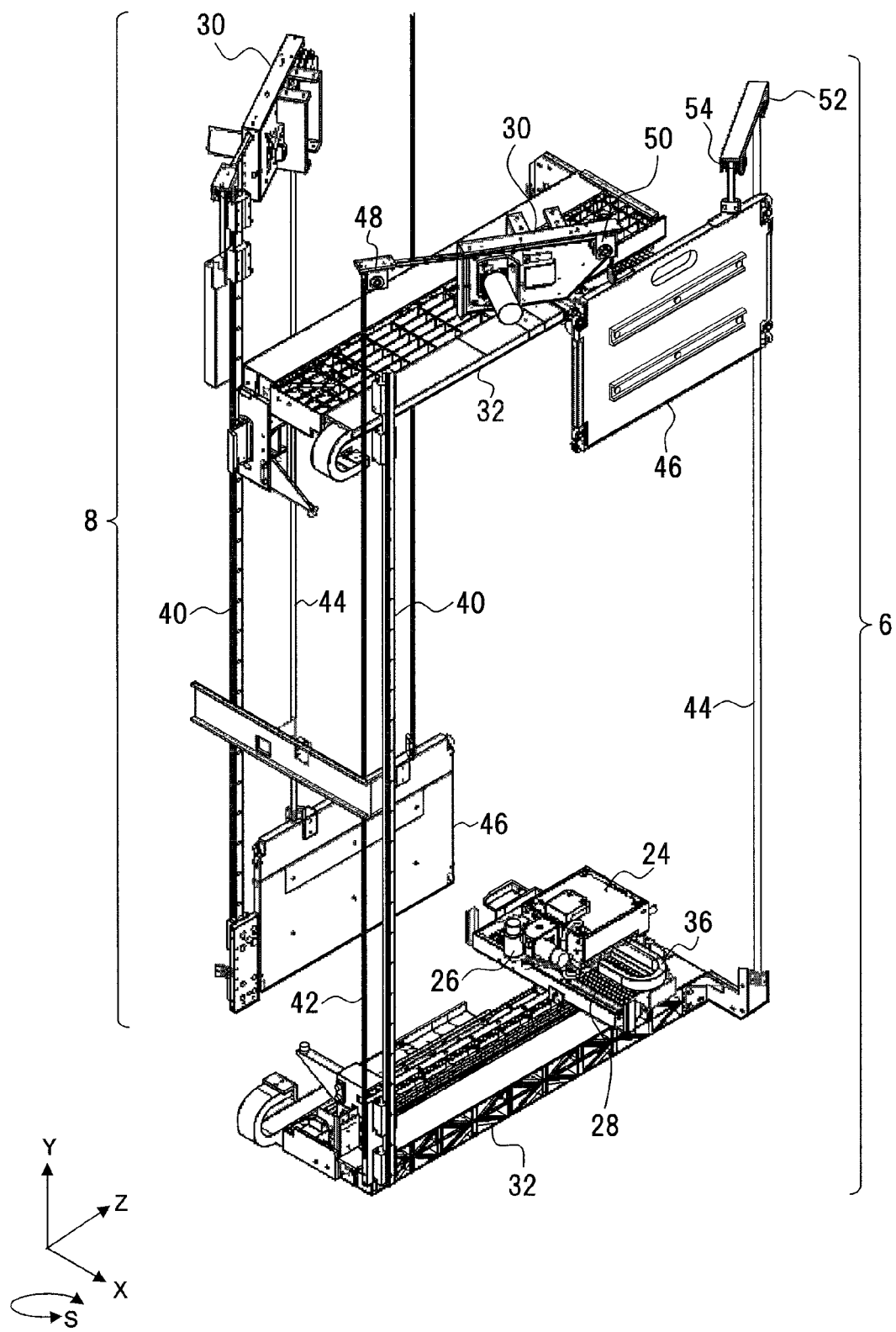
FIG. 2 is a perspective view of an example of a medium transport mechanism unit.

Description will be made of a cable carrying mechanism and a library apparatus of the present invention with reference to FIGS. 1, 2, and 3. FIG. 1 is a perspective view of an example of a library apparatus; FIG. 2 is a perspective view of an example of a medium transport mechanism unit; and FIG. 3 shows a positional relationship among the medium transport mechanism unit, medium shelves, and a record reproduction apparatus.

Figure 3:
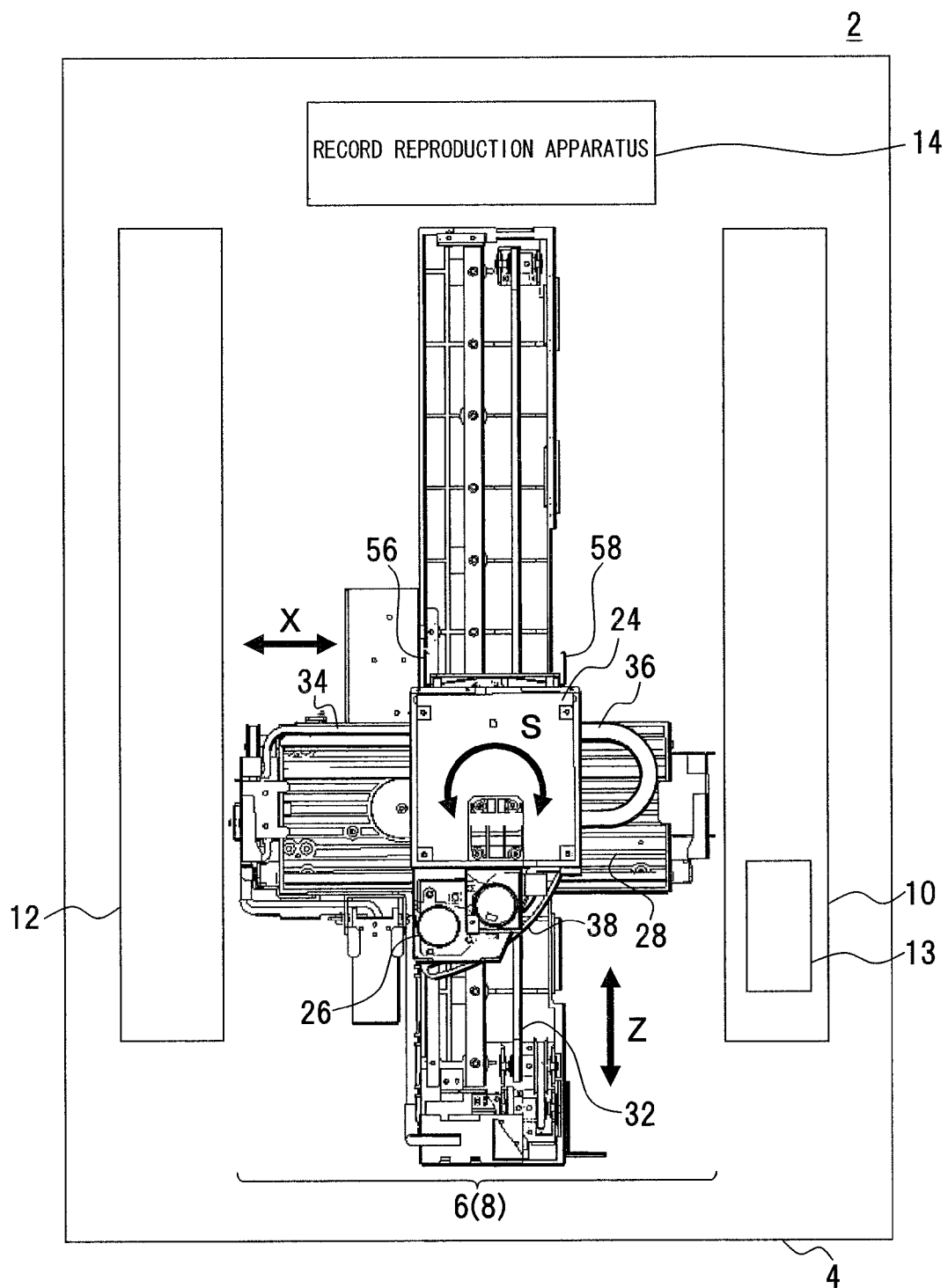
FIG. 3 shows a positional relationship among the medium transport mechanism unit, medium shelves, and a record reproduction apparatus.

As shown in FIG. 1, a library apparatus 2 includes a housing 4 in a rectangular solid shape, for example, and this housing 4 is provided with a pair of medium transport mechanism units 6, 8 as shown in FIG. 2 as well as a right medium shelf 10 and a left medium shelf 12 sandwiching the medium transport mechanism unit 6 and a record reproduction apparatus 14 on the back side of the medium transport mechanism unit 6 as shown in FIG. 3. The medium shelves 10, 12 store a recording medium such as a cartridge recording medium. In a front panel unit 16 disposed on the front side of the housing 4, openings 18, 20 is formed which are used for taking out and putting in the recording medium 13 for recording, reproducing and storing, along with a window 22.

The medium transport mechanism unit 6 includes: a medium gripping mechanism unit 24 that is a movable unit moving in a movement space defined within a distance between the medium shelves 10, 12, such as turning while gripping the recording medium 13; a swivel mechanism unit 26 that turns the medium gripping mechanism unit 24; an X-axis carrying mechanism unit 28 that carries the medium gripping mechanism unit 24 in the X-axis direction; a Y-axis carrying mechanism unit 30 that carries the medium gripping mechanism unit 24 in the Y-axis direction; and an Z-axis carrying mechanism unit 32 that carries the medium gripping mechanism unit 24 in the Z-axis direction. In this embodiment, the X-axis direction is a parallel direction relative to the front panel unit 16; the Y-axis direction is an up-and-down direction; and the Z-axis direction is a back-and-forth direction.

The medium gripping mechanism unit 24 and the swivel mechanism unit 26 is provided with a cable bearer 36 that is a cable carrying unit of the cable carrying mechanism carrying a swivel cable (hereinafter, "cable") 34 constituted by a round cable, etc. led by the medium gripping mechanism unit 24 while maintaining the cable flexible; in the cable bearer 36, one end is fixed end and the other end is a moving end; and a guide mechanism unit 38 is provided for guiding and carrying the moving end of the cable bearer 36 when the moving end moves following the rotation of the medium gripping mechanism unit 24. The cable bearer 36 is a protective cover that covers the cable 34 while allowing the cable 34 to be bent as well as a carrying member that can be bent in the horizontal direction while keeping the cable 34 horizontal and is constituted by bellows, for example.

The medium transport mechanism unit 6 includes the medium gripping mechanism unit 24, the X-axis carrying mechanism unit 28, and the Z-axis carrying mechanism unit 32, and the Z-axis carrying mechanism unit 32 mounted with the medium gripping mechanism unit 24 and the X-axis carrying mechanism unit 28 is slidably supported by a guide rail unit 40 and is coupled to a balancer 46 in the form of a plate by timing belts 42, 44. The weight of the balancer 46 is the same as the weight of the Z-axis carrying mechanism unit 32 mounted with the medium gripping mechanism unit 24 and the X-axis carrying mechanism unit 28. The timing belt 42 is suspended by pulleys 48, 50 and the timing belt 44 is suspended by pulleys 52, 54 to suspend and balance the Z-axis carrying mechanism unit 32 mounted with the medium gripping mechanism unit 24 and the X-axis carrying mechanism unit 28 and the balancer 46. Therefore, when the timing belt 42 is moved by the Y-axis carrying mechanism unit 30, the Z-axis carrying mechanism unit 32 can be ascended or descended correspondingly to the movement direction of the timing belt 42, that is, the Z-axis carrying mechanism unit 32 can be moved in the Y-axis direction easily. Since such a configuration of the medium transport mechanism unit 6 is the same as that of the medium transport mechanism unit 8, the same symbols are added and the description thereof is omitted.

In such a configuration, as shown in FIG. 3, the medium gripping mechanism unit 24 can be turned by the swivel mechanism unit 26 in the direction indicated by an arrow S, can be moved by the X-axis carrying mechanism unit 28 in the direction indicated by an arrow X, and can be moved by the Z-axis carrying mechanism unit 32 in the direction indicated by an arrow Z. The cable 34 is protected by the cable bearer 36 and is carried by following the rotation and linear movement of the medium gripping mechanism unit 24, and since the movement range thereof is restricted by the cable bearer 36 and the guide mechanism unit 38, the cable 34 is protected from excessive stress due to the movement of the medium gripping mechanism unit 24.

Figure 4:
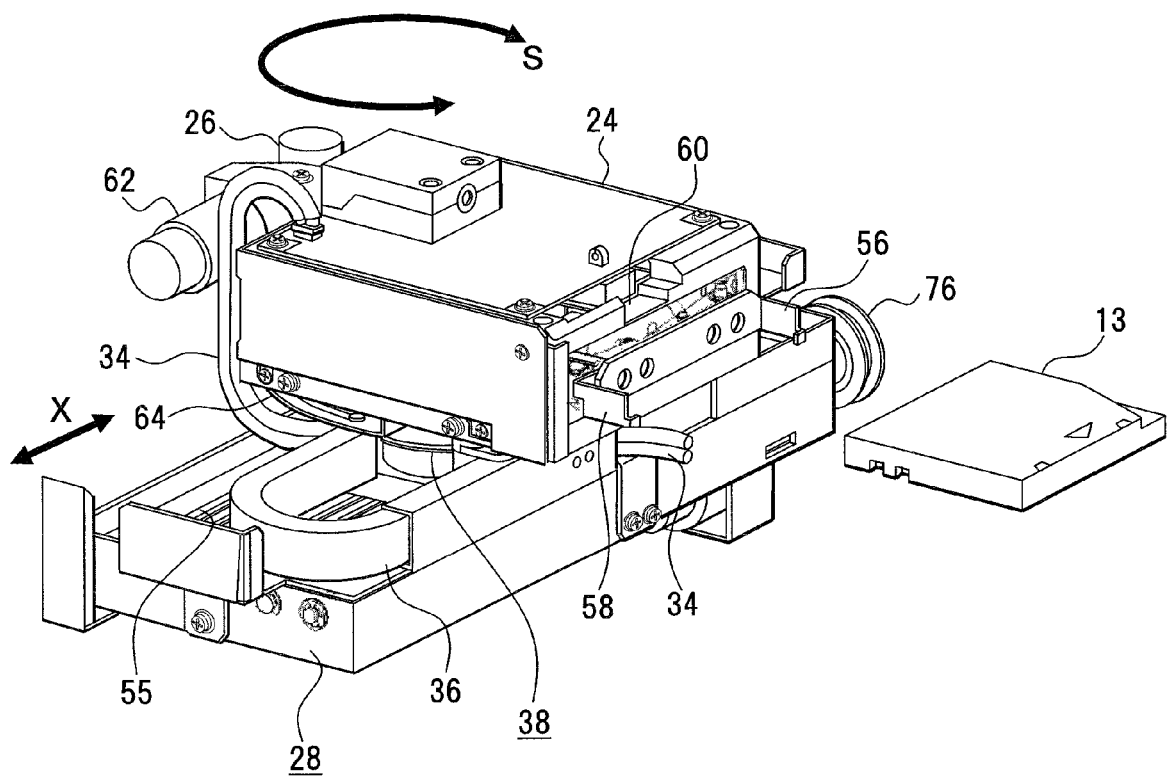
FIG. 4 is a perspective view of an X-axis carrying mechanism unit, a swivel mechanism unit, and a medium gripping mechanism unit.
Figure 5:
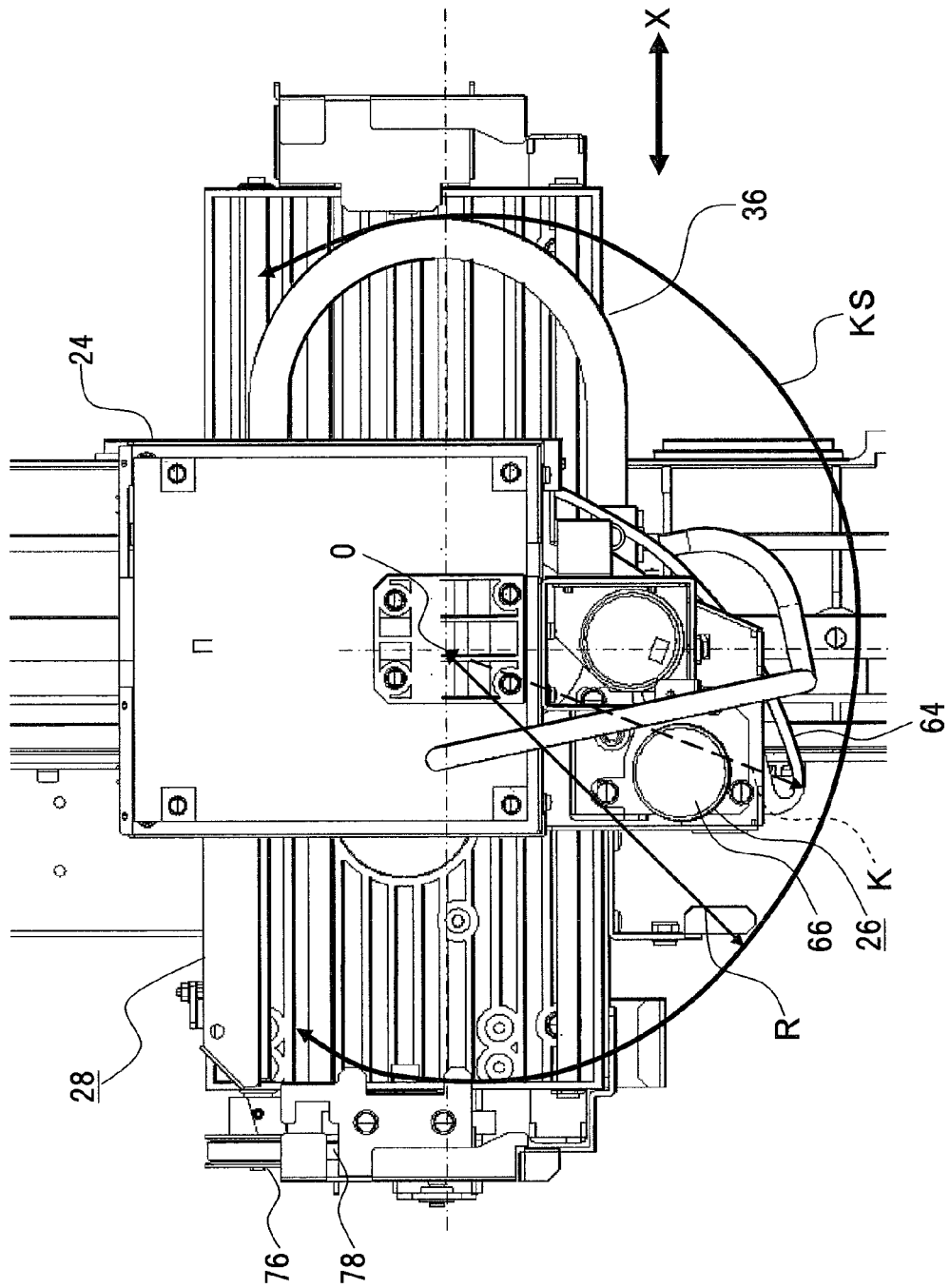
FIG. 5 shows a movement range of a cable in the X-axis carrying mechanism unit, the swivel mechanism unit, and the medium gripping mechanism unit.

Description will be made of the cable bearer 36 and the guide mechanism unit 38 in the medium transport mechanism unit with reference to FIG. 4 and FIG. 5. FIG. 4 is a perspective view of the medium transport mechanism unit and FIG. 5 shows the movement range of the cable in the medium transport mechanism unit. In FIGS. 4 and 5, the same symbols are added to the portions same as those of FIGS. 2 and 3.

As shown in FIG. 4, the swivel mechanism unit 26 is mounted on a rail unit 55 of the X-axis carrying mechanism unit 28; the swivel mechanism unit 26 can move in a movement space along the rail unit 55; and the swivel mechanism unit 26 is equipped with the medium gripping mechanism unit 24 that is a movable unit capable of swiveling. The medium gripping mechanism unit 24 includes picker arm units 56, 58 that are gripping mechanism units for gripping the recording medium 13 and is equipped with a motor 62 that drives a manipulating mechanism 60 manipulating the opening and closing intervals of the picker arm units 56, 58. One end of the cable bearer 36 is fixed to the under side of the piker arm unit 58 of the medium gripping mechanism unit 24 and the other end is movably supported by a cam plate 64 that is a guide rail unit of the guide mechanism unit 38. A plurality of the cables 34 is led into one end of the cable bearer 36, is pulled out from the other end, and is led to the power feeding side of the medium gripping mechanism unit 24. In FIG. 4, an arrow S shows the aforementioned turning direction and an arrow X shows the movement direction of the aforementioned medium gripping mechanism unit 24.

Since the medium gripping mechanism unit 24 is turned by the swivel mechanism unit 26 and is moved horizontally in the X-axis direction on the rail unit 55, the cable 34 has the movement range shown by an arrow KS as shown in FIG. 5 due to the rotation and the horizontal movement. In FIG. 5, a dotted arrow K is a maximum turning radius of the cam plate 64 from the center O of the swivel axis; R is a maximum turning radius of the cable 34; and the radius R is varied depending on the movement position in the X-axis direction. Therefore, the movement range KS is formed by the rotation and the movement in the X-axis of the medium gripping mechanism unit 24 as well as the deformation of the cable bearer 36. A motor 66 is a driving source that applies a turning force to the swivel mechanism unit 26.

As described above, the curvature radius of the cable 34 is varied following the rotation movement of the medium gripping mechanism unit 24; the rotation ranges of the cable 34, the cable bearer 36, and the guide mechanism unit 38 are restricted within the ranges shown by the arrows R, KS; and the cable bearer 36 is not significantly projected from a frame 68. In this way, the cable 34 carried by the cable bearer 36 and the guide mechanism unit 38 is protected from the stress due to the movement and the rotation of the medium gripping mechanism unit 24.

Figure 6:
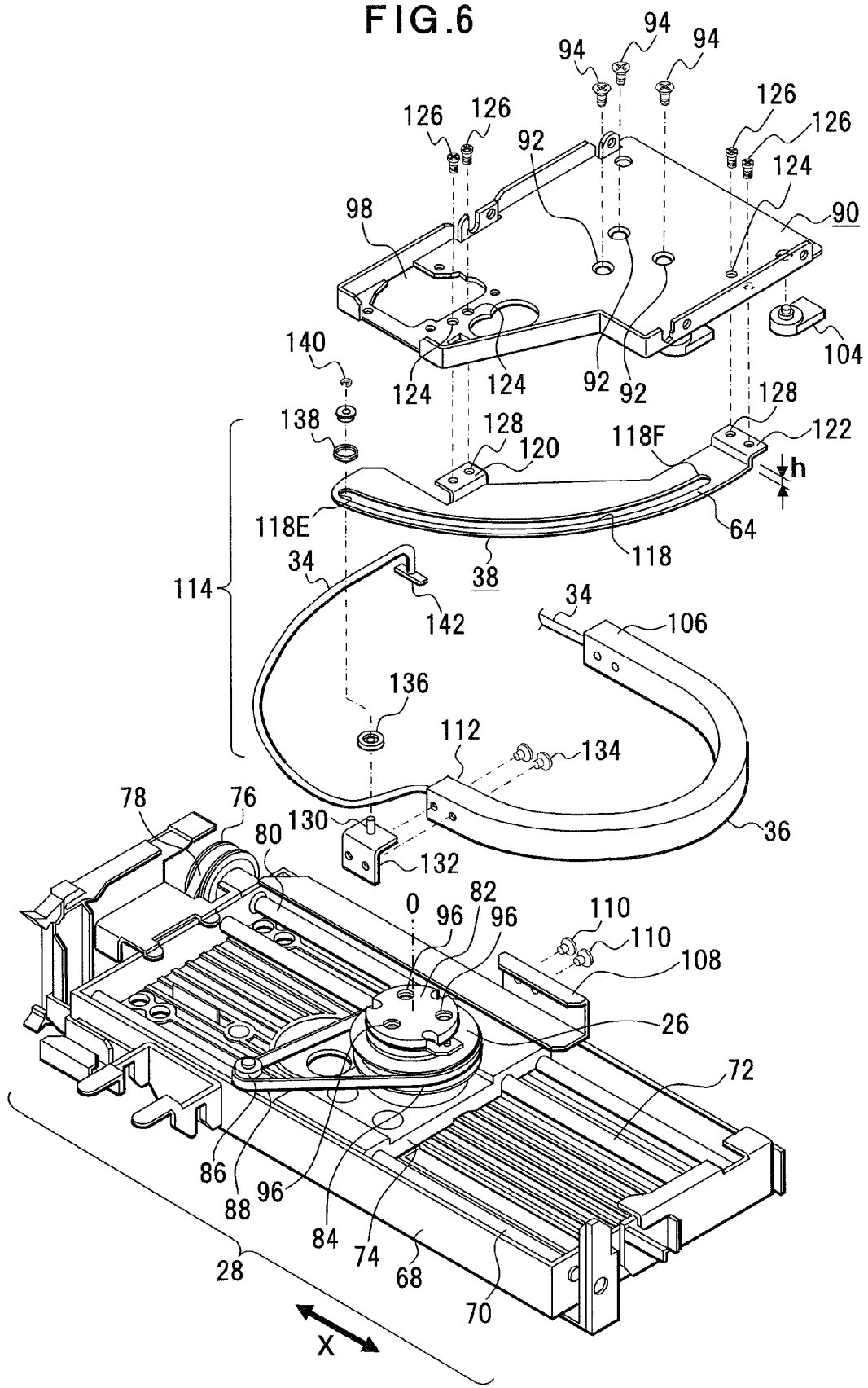
FIG. 6 is an exploded perspective view of the X-axis carrying mechanism unit, the swivel mechanism unit, and the medium gripping mechanism unit.
Figure 7:
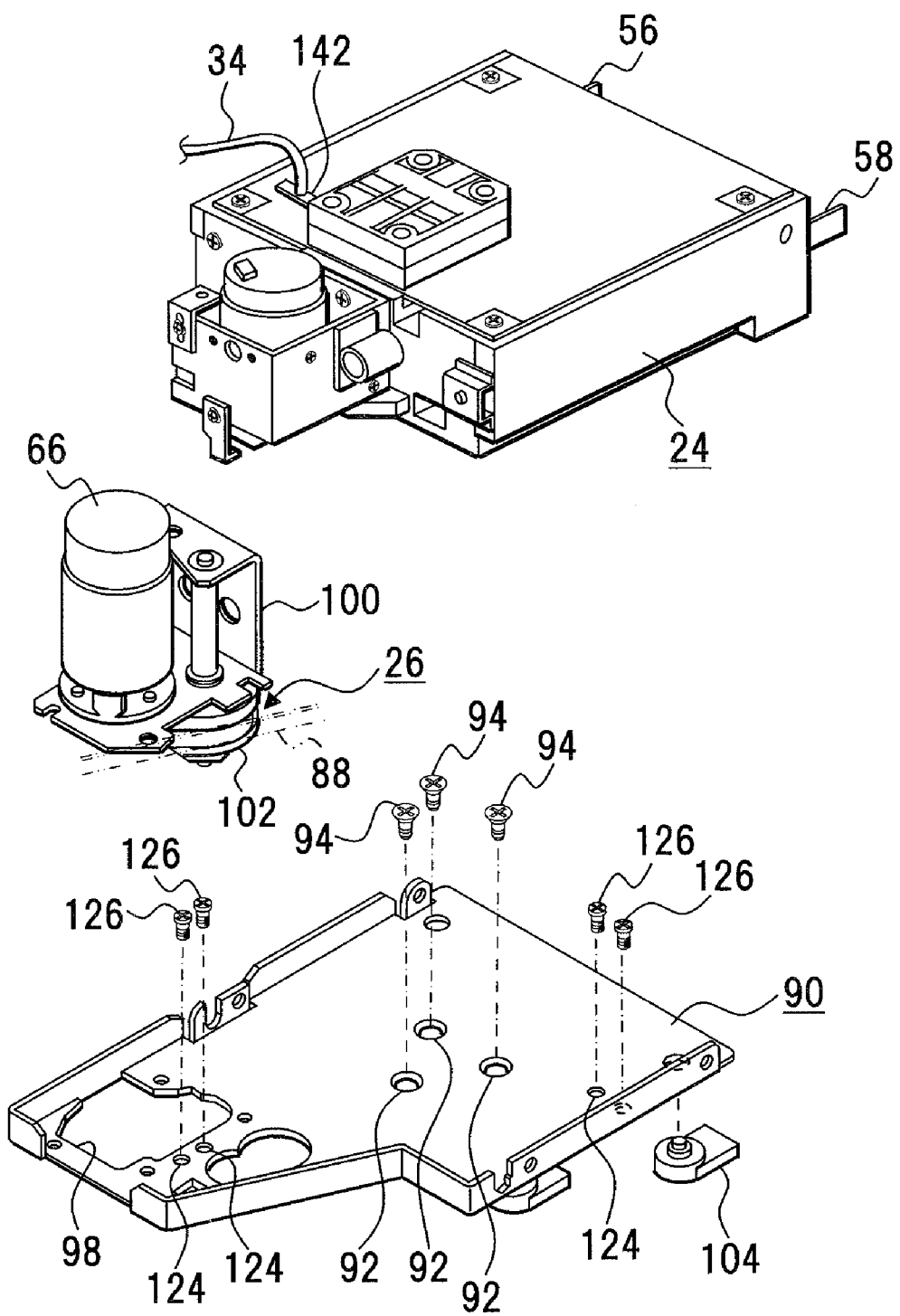
FIG. 7 is an exploded perspective view of the swivel mechanism unit and the medium gripping mechanism unit continued from FIG. 6.

The cable carrying mechanism will be described with reference to FIGS. 6 and 7. FIGS. 6 and 7 are exploded perspective views of the X-axis carrying mechanism unit, the swivel mechanism unit, and the medium gripping mechanism unit. In FIGS. 6 and 7, the same symbols are added to the portions same as those of FIGS. 2 to 5.

On the X-axis carrying mechanism unit 28 moving the medium gripping mechanism unit 24 in the X-axis direction, guide rail units 70, 72 are disposed on the frame 68 in a rectangular solid shape in the X-axis direction, and a slider 74 is slidably disposed on the guide rail units 70, 72. To move the slider 74, a timing pulley 76 is disposed at the side of the frame 68, and a turning force from a motor not shown is transmitted to the timing pulley 76 by a timing belt 78. The rotation force of the timing pulley 76 is applied to a ball screw 80 that converts the rotation force to a moving force of the slider 74 in the X-axis direction, and the rotation of the ball screw 80 is transmitted for moving the slider 74 in the X-axis direction.

On the slider 74, a swivel shaft 82 of the swivel mechanism unit 26 is rotatably disposed in an upright position for turning the medium gripping mechanism unit 24, and a timing belt 88 is disposed between and around a timing pulley 84 for applying a turning force to the swivel shaft 82 and a timing pulley 86 on the slider 74. A swivel base 90 is disposed on the swivel shaft 82, and the swivel base 90 is integrated and fixed to the swivel shaft 82 by screwing fixing screws 94 from a plurality of mounting holes 92 of the swivel base 90 into corresponding screw holes 96 of the swivel shaft 82. As shown in FIG. 7, the swivel base 90 is equipped with the medium gripping mechanism unit 24, and a motor fixing frame 100 of the swivel motor 66 is mounted in a fixing window 98 of the swivel base 90. A drive timing pulley 102 attached to the under side of the motor fixing frame 100 penetrates the fixing window 98 and is disposed on the back side of the swivel base 90, and the aforementioned timing belt 88 is disposed around the drive timing pulley 102 with a predetermined tension. Therefore, the rotation force of the swivel motor 66 is applied to the drive timing pulley 102, and the rotation force is transmitted through the timing belt 88 to the swivel shaft 82 to turn the medium gripping mechanism unit 24 along with the swivel base within a predetermined angular range. A stopper 104 is attached at a swivel stop position of the swivel base 90.

A bracket 108 is attached to the frame 68 of the X-axis carrying mechanism unit 28 for fixing the fixed end of the cable bearer 36, and the fixed end 106 of the cable bearer 36 is fixed to the bracket 108 with a plurality of fixing screws 110. Since the fixed end 106 of the cable bearer 36 is fixed though the bracket 108 to the frame 68, i.e., a support unit rotatably supporting the medium gripping mechanism unit 24 that is a movable unit, the fixed end 106 of the cable bearer 36 is maintained at a predetermined position regardless of the movement of the slider 74 and the rotation of the swivel shaft 82. In other words, the entering position of the cable 34 is set to the position of the fixed end 106 of the cable bearer 36.

On the swivel base 90, the cam plate 64 of a cam mechanism unit 114 is disposed, which is an example of the guide mechanism unit guiding the movement of the moving end 112 of the cable bearer 36. The cam mechanism unit 114 rotatably supports the moving end 112 of the cable bearer 36 to make the moving end 112 follow the swivel motion of the swivel mechanism unit 26 and restricts the movement range of the cable bearer 36. Therefore, in the cam plate 64 of the cam mechanism unit 114, a cam groove 118 is formed for setting the movement path and the movement range of the moving end 112 of the cable bearer 36, and fixing legs 120, 122 are formed. The cam groove 118 is in the shape of a circular arc and is located concentrically to the swivel shaft 82, and to facilitate the description, one end of the cam groove 118 is referred to as a front end 118F and the other end is referred to as a rear end 118E. The fixing legs 120, 122 of the cam plate 64 are applied to the under surface of the swivel base 90, and the cam plate 64 is fixed to the under surface of the swivel base 90 by fixing a plurality of fixing screws 126 penetrating mounting holes 124 of the swivel base 90 into screw holes 128 of the fixing legs 120, 122. Since the fixing legs 120, 122 in provided with a height h, the height h maintains an interval between the swivel base 90 and the cam plate 64.

An L-shape fixing unit 132 with a slide shaft 130, i.e., a sliding unit disposed in an upright position is fixed to the moving end 112 of the cable bearer 36 using a fixing screw 134, and the slide shaft 130 is inserted into the cam groove 118 of the cam plate 64. To the slide shaft 130, rotators 136, 138 are rotatably attached on the upper and lower surface of the cam plate 64, and an E ring 140 is fixed to act as a fixing unit. That is, the moving end 112 of the cable bearer 36 is movably supported in the cam groove 118 of the cam plate 64 by the slide shaft 130.

The cable 34 led out from the moving end 112 of the cable bearer 36 has a predetermined extra length allowing for the swivel movement; a connection fixing unit 142 is provided on the leading end thereof and is connected to a cable entering portion on the upper surface of the medium gripping mechanism unit 24; and electric power is supplied through the cable 34 to the medium gripping mechanism unit 24. That is, the electric power is supplied to the power supplied unit or driving unit of the medium gripping mechanism unit 24.

Figure 8:
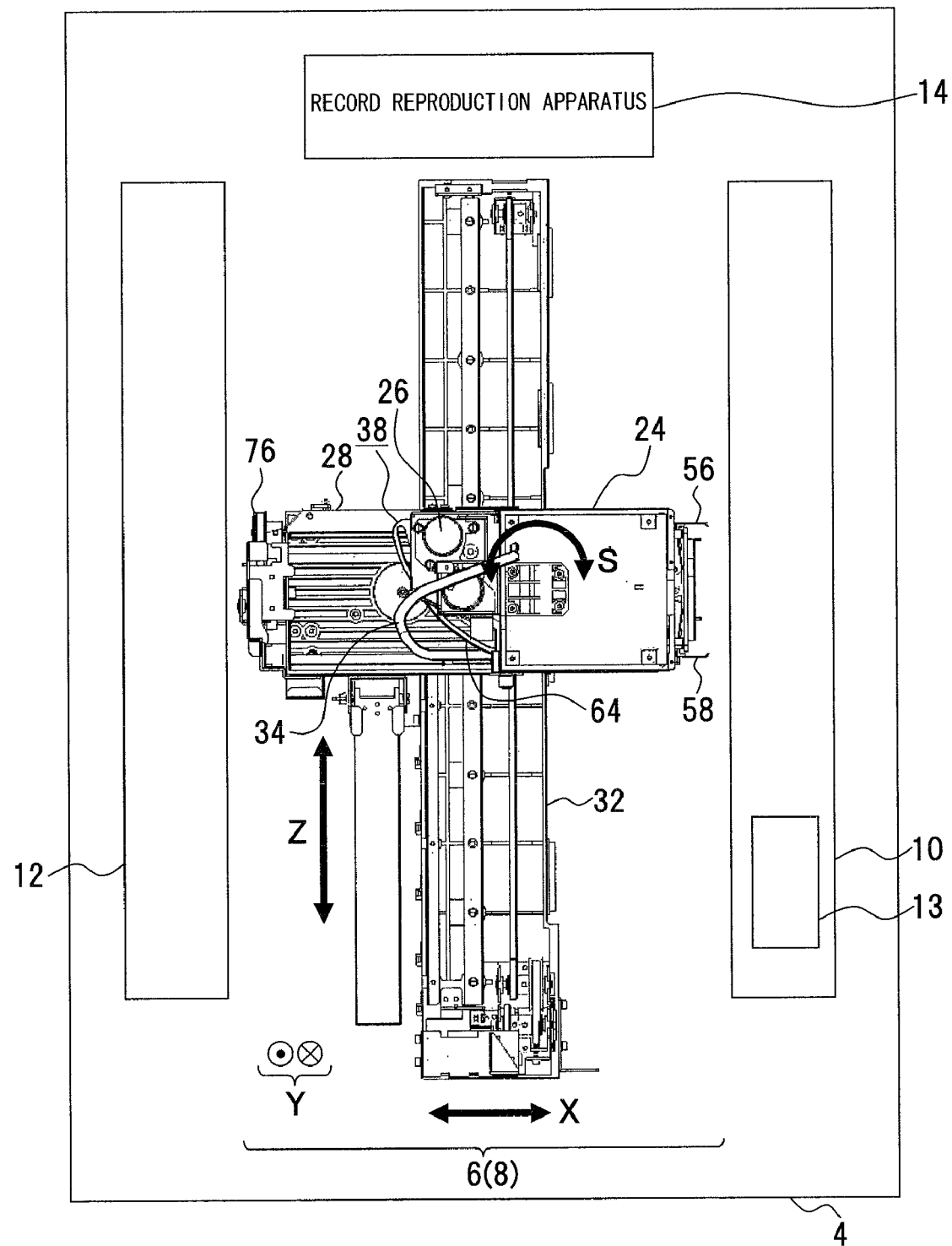
FIG. 8 shows a state of the medium gripping mechanism unit turning to the right medium shelf.
Figure 9:
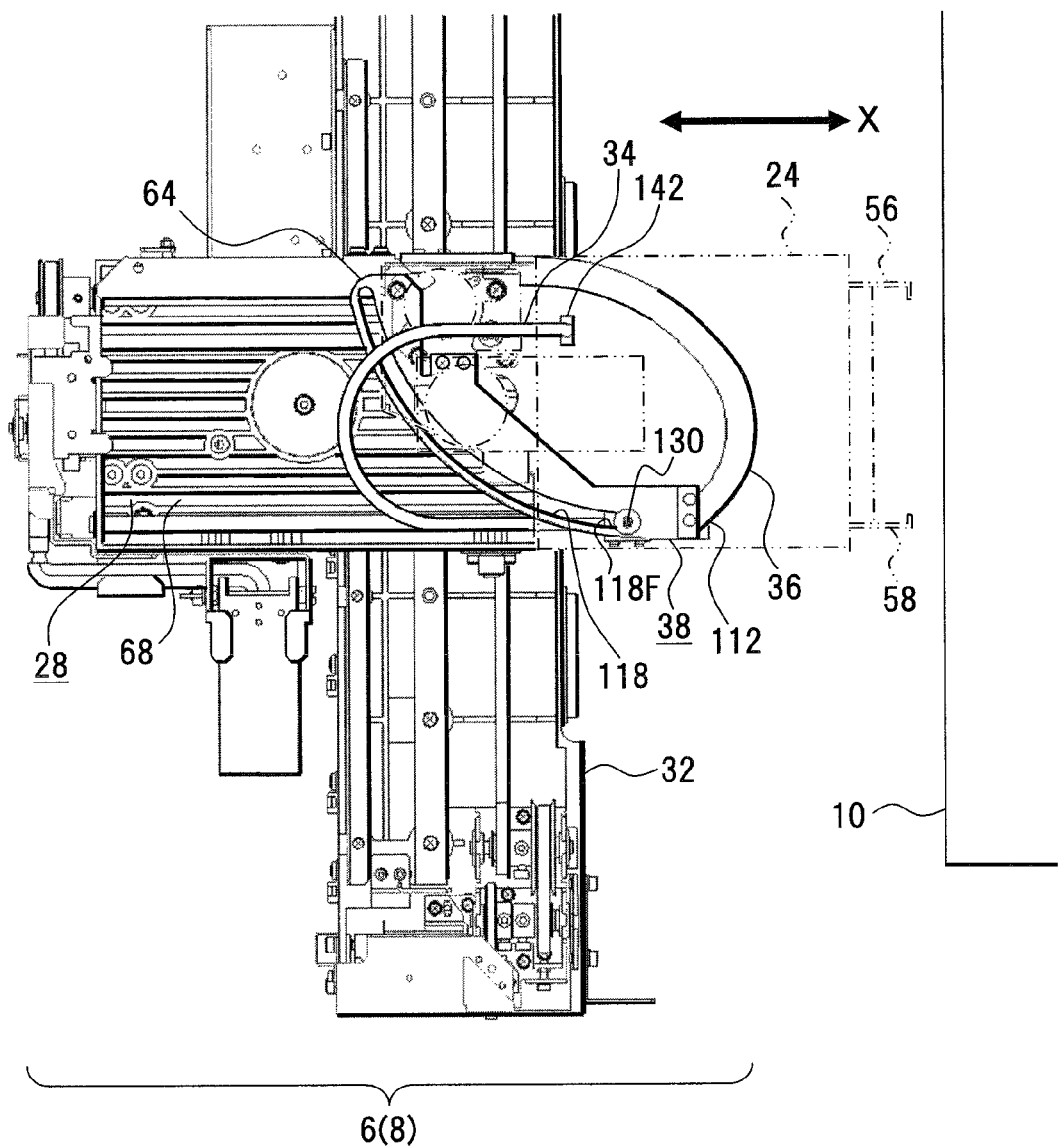
FIG. 9 shows behavior of a cable bearer and a cable when the medium gripping mechanism unit is turned in the clockwise direction.
Figure 10:
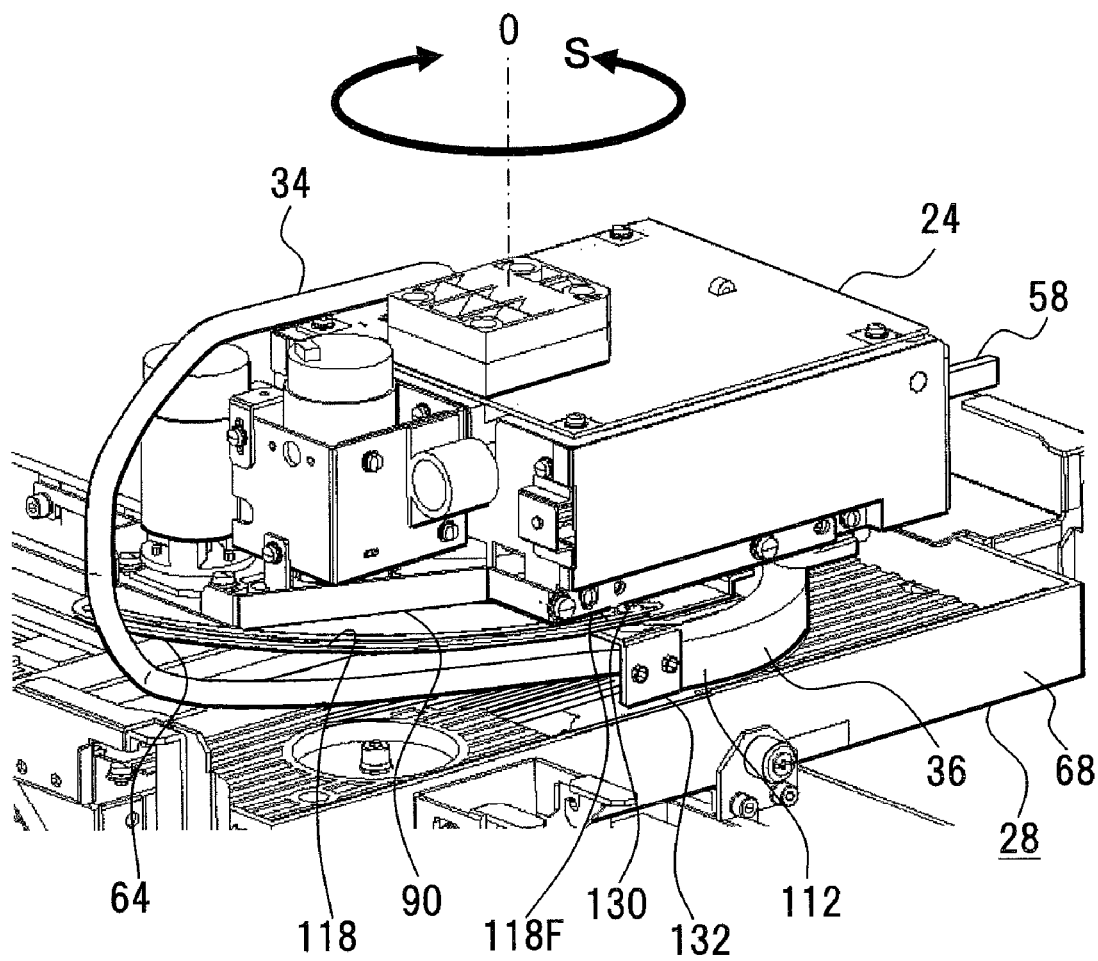
FIG. 10 shows behavior of the cable bearer and the cable when the medium gripping mechanism unit is turned in the clockwise direction.
Figure 13:
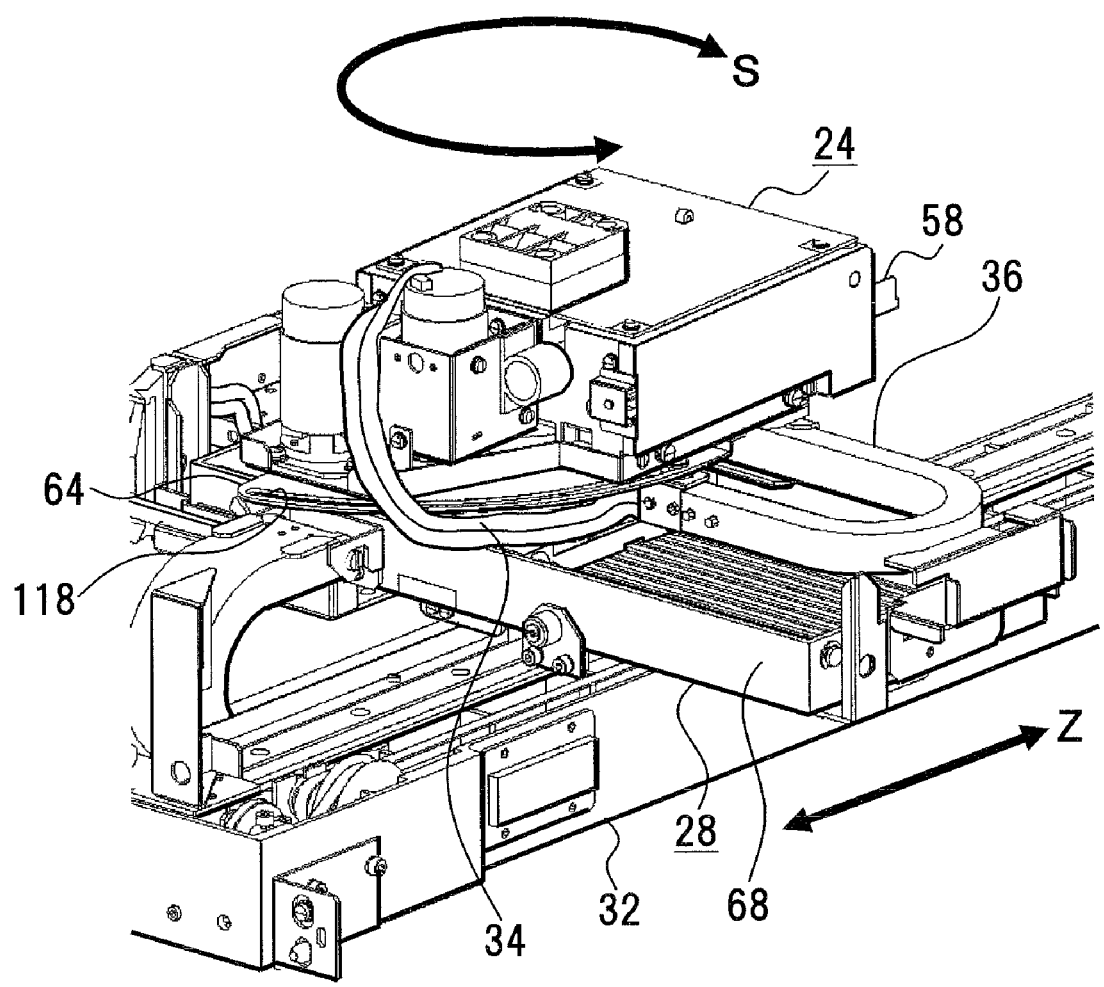
FIG. 13 shows behavior of the cable bearer and the cable when the medium gripping mechanism unit is turned to the record reproduction apparatus.
Figure 14:
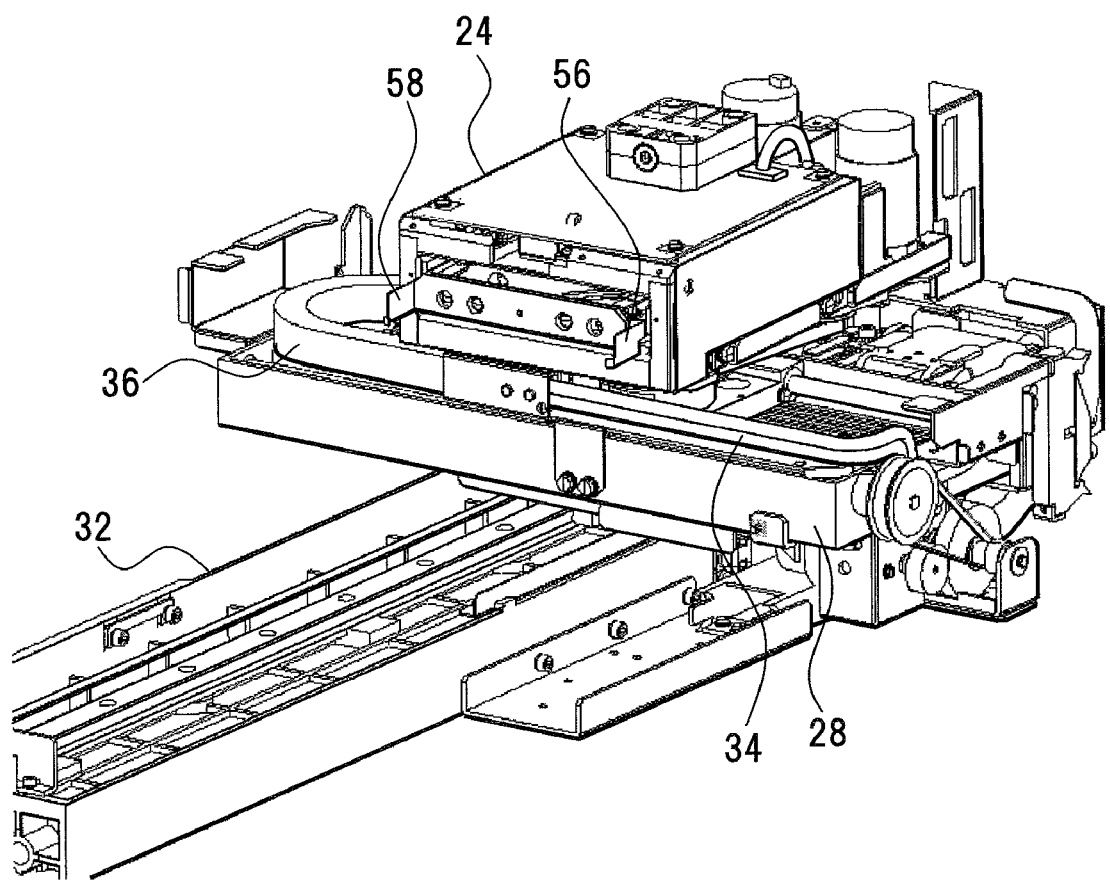
FIG. 14 shows behavior of the cable bearer and the cable when the medium gripping mechanism unit is turned to the record reproduction apparatus.
Figure 15:
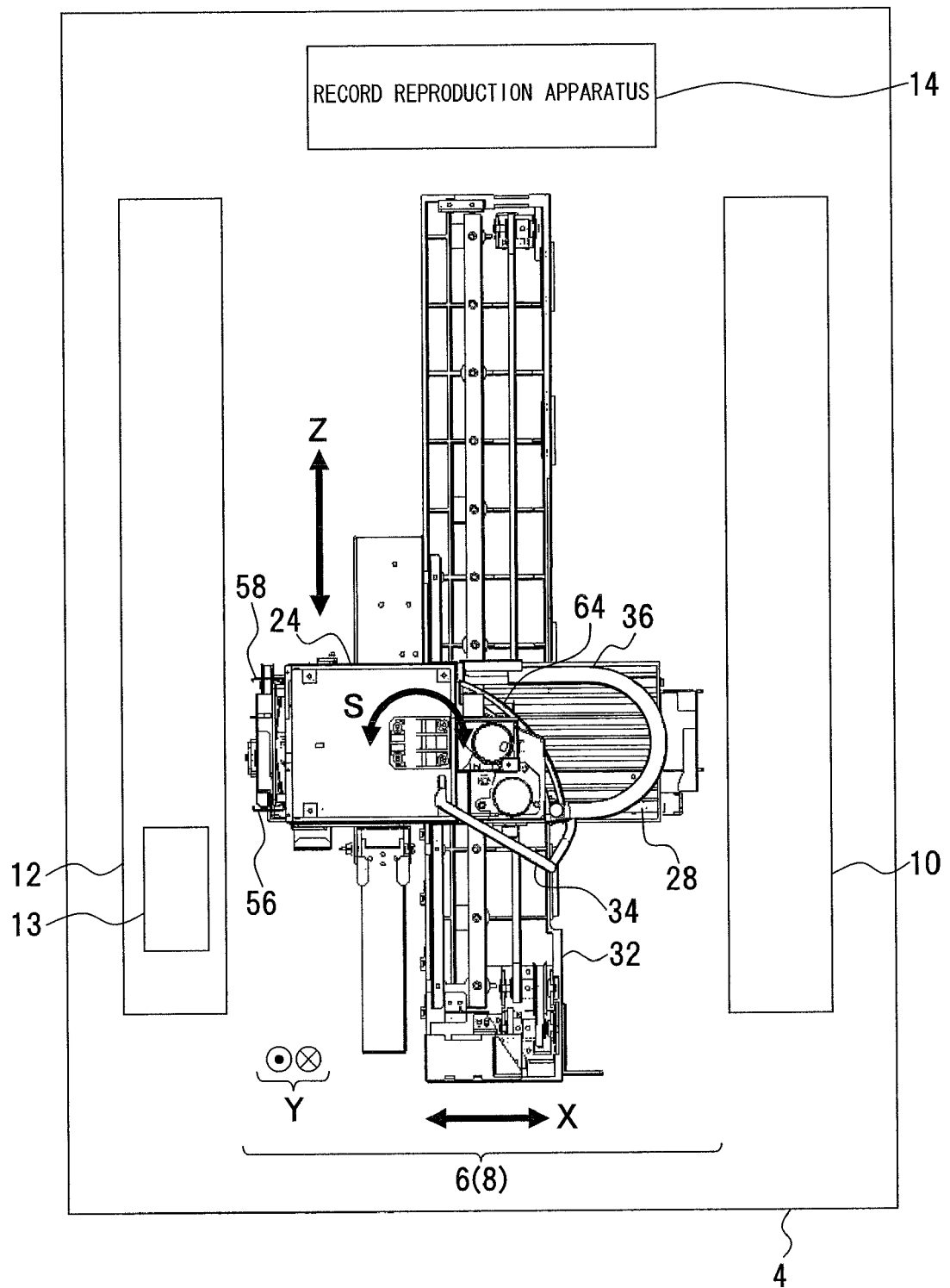
FIG. 15 shows a state of the medium gripping mechanism unit turning to the left medium shelf.
Figure 16:
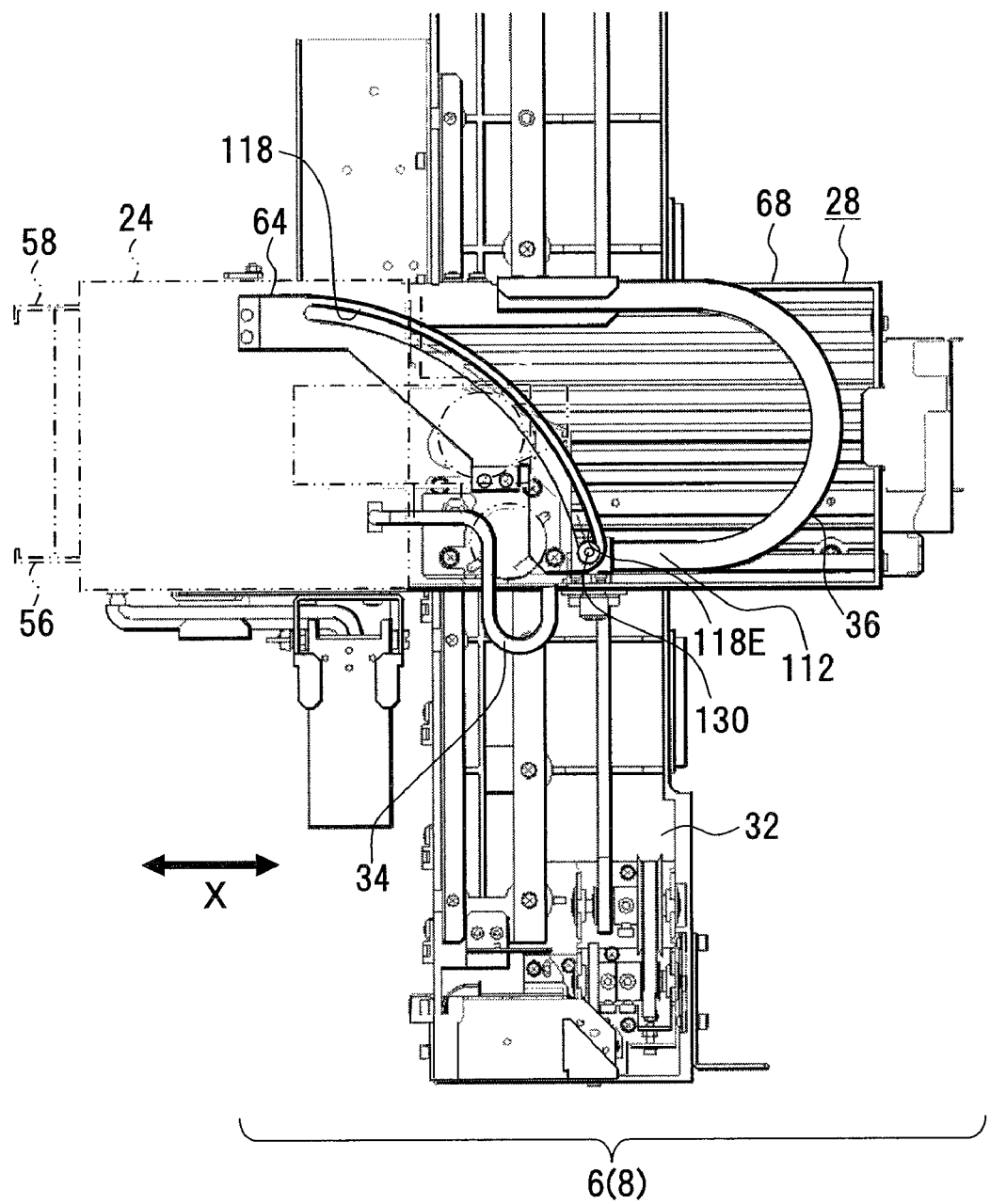
FIG. 16 shows behavior of the cable bearer and the cable when the medium gripping mechanism unit is turned in the anticlockwise direction.
Figure 17:
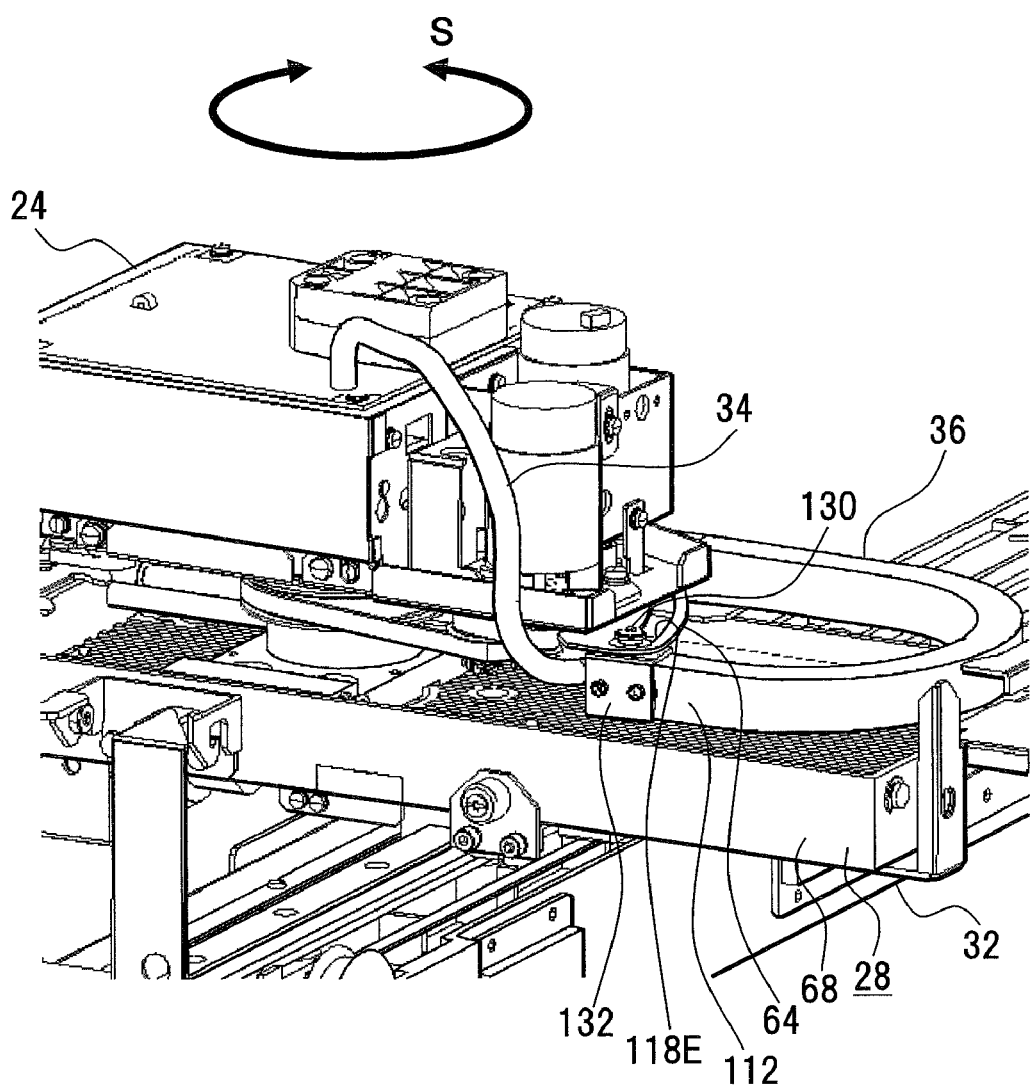
FIG. 17 shows behavior of the cable bearer and the cable when the medium gripping mechanism unit is turned in the anticlockwise direction.
Figure 18:
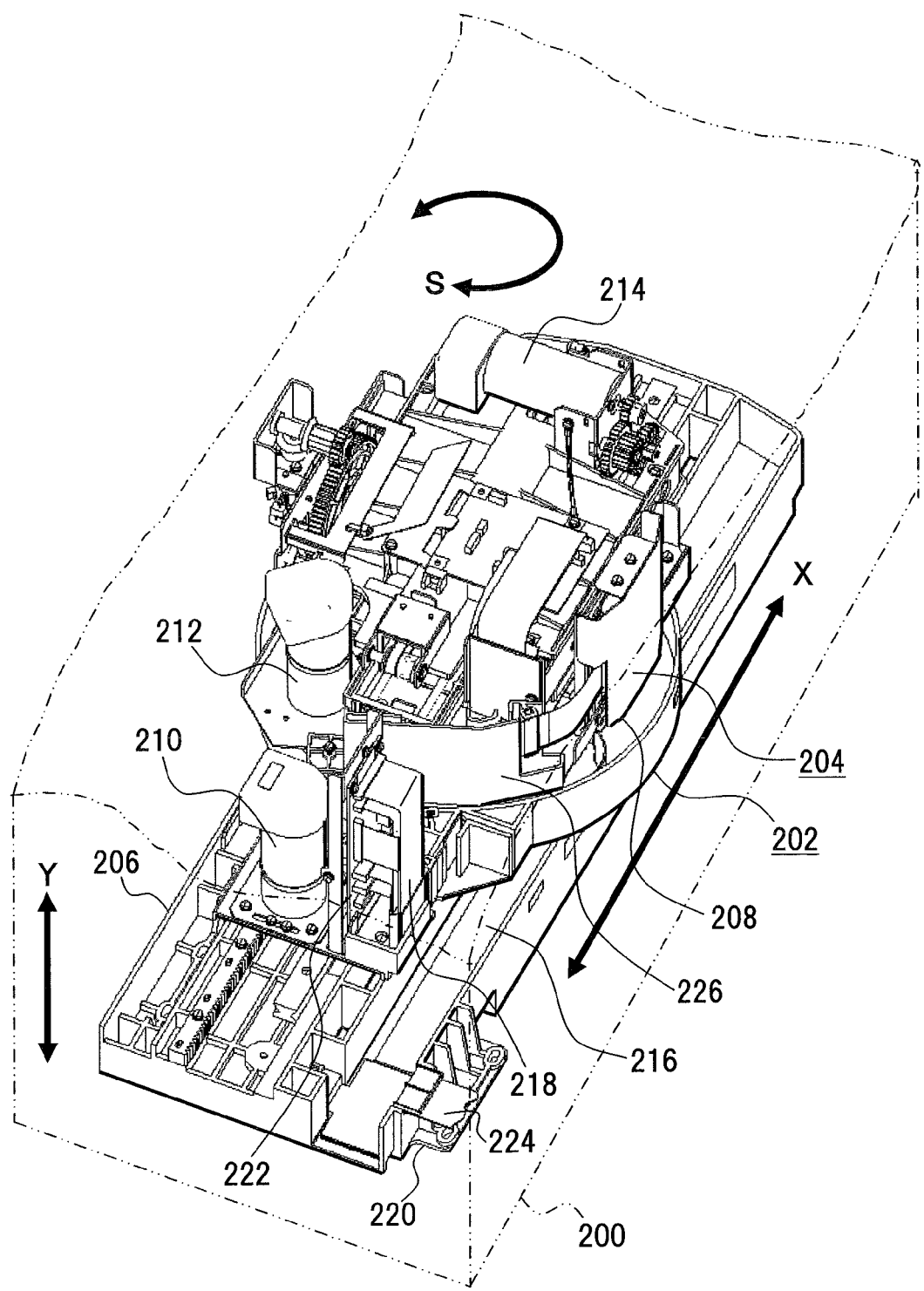
FIG. 18 is a perspective view of the library apparatus.
Figure 19A:
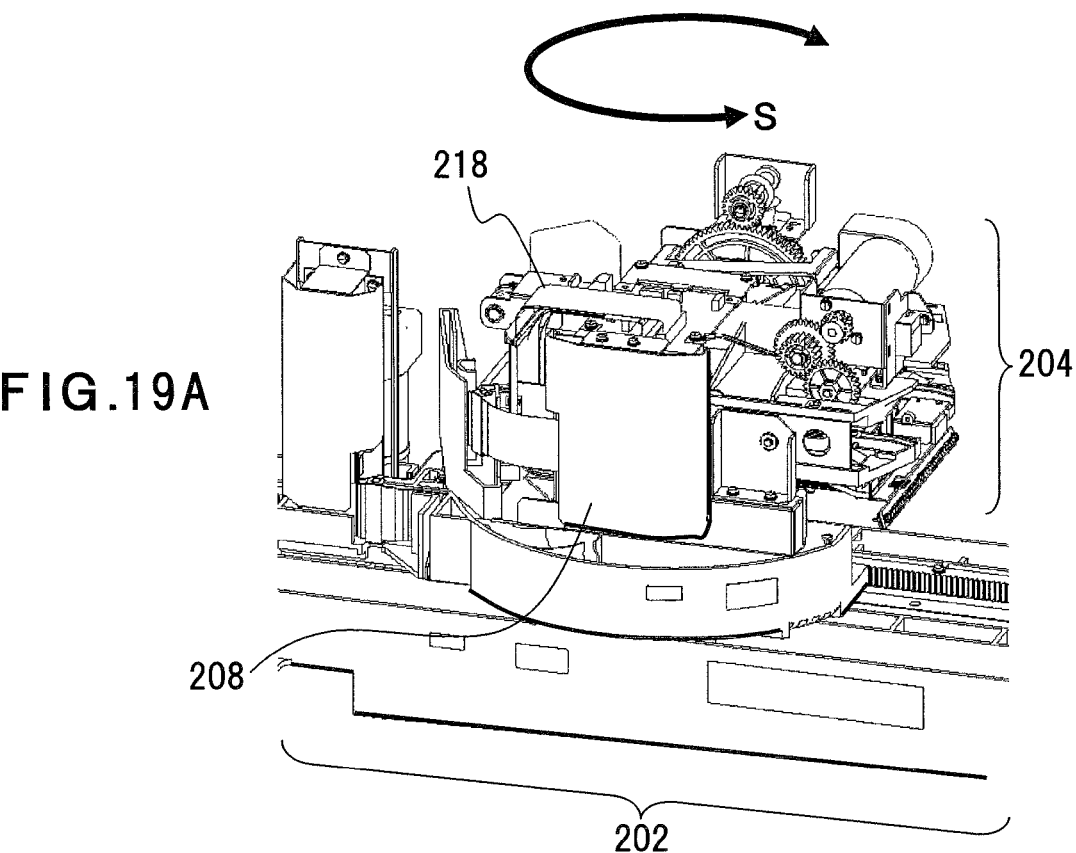
FIGS. 19A and 19B are perspective views of the medium transport mechanism unit of the library apparatus of FIG. 18.
Figure 19B:
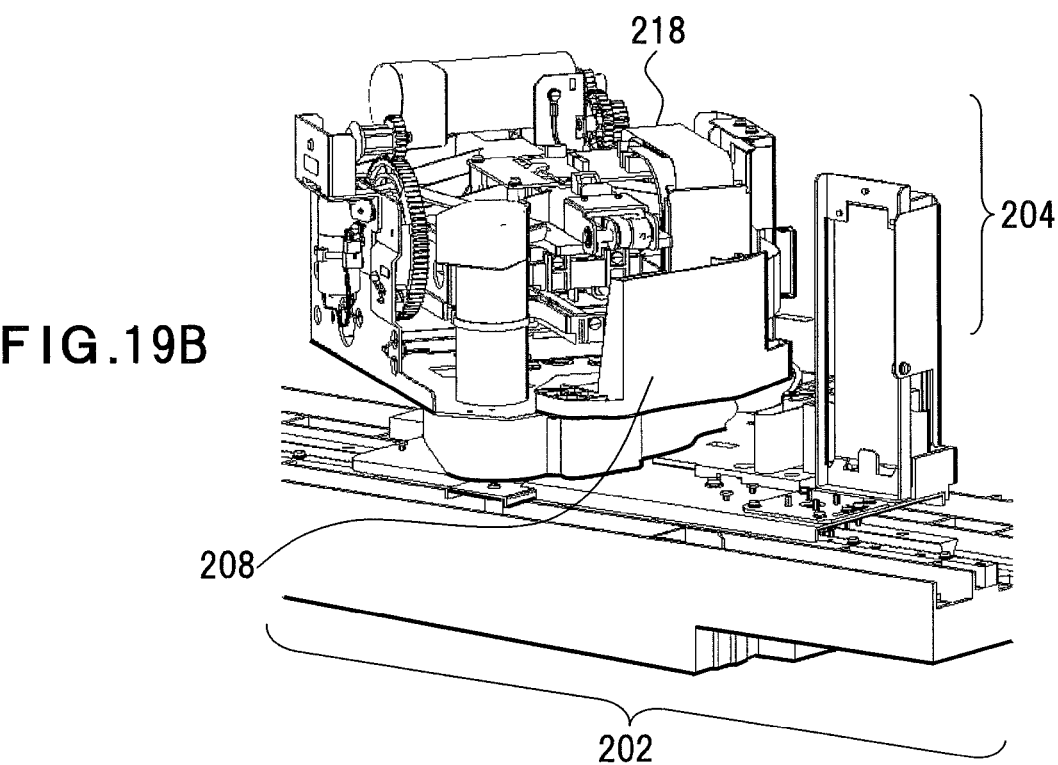
Figure 20B:
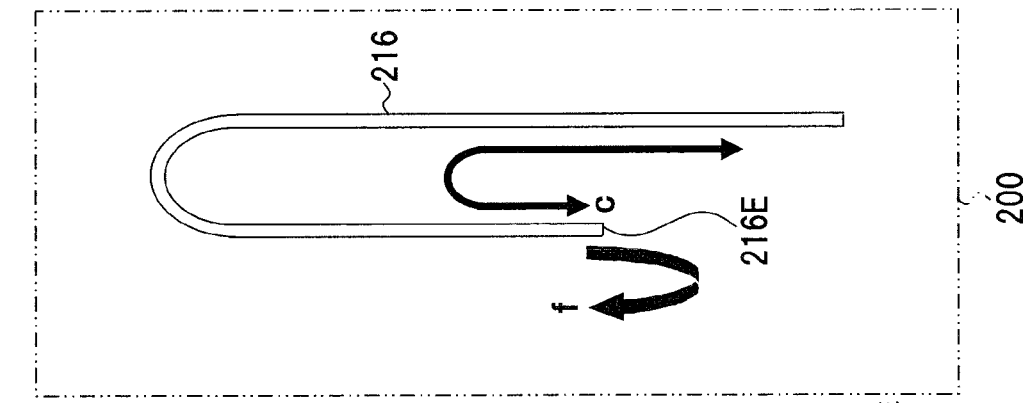
FIGS. 20A and 20B show the operation and behavior of the medium transport mechanism unit.
Figure 20A:
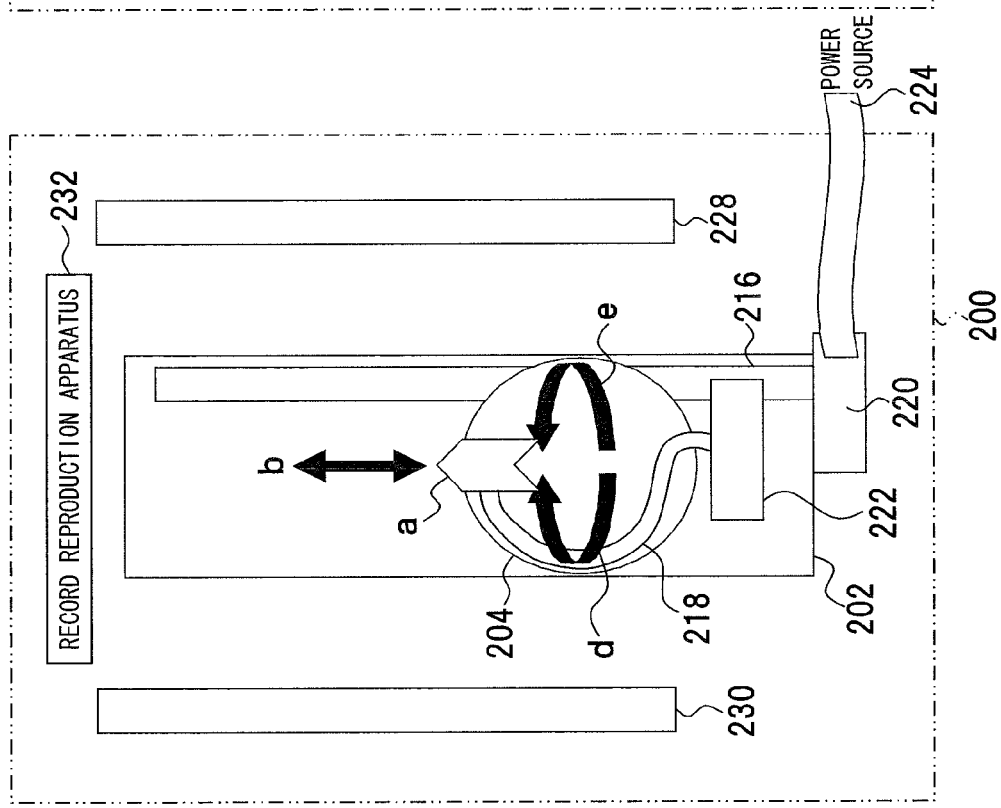
Figure 22B:
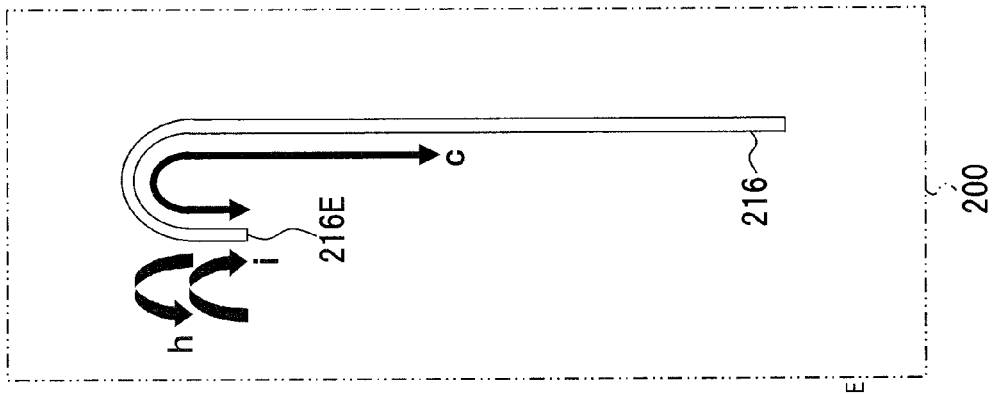
FIGS. 22A and 22B show the operation and behavior of the medium transport mechanism unit.
Figure 22A:
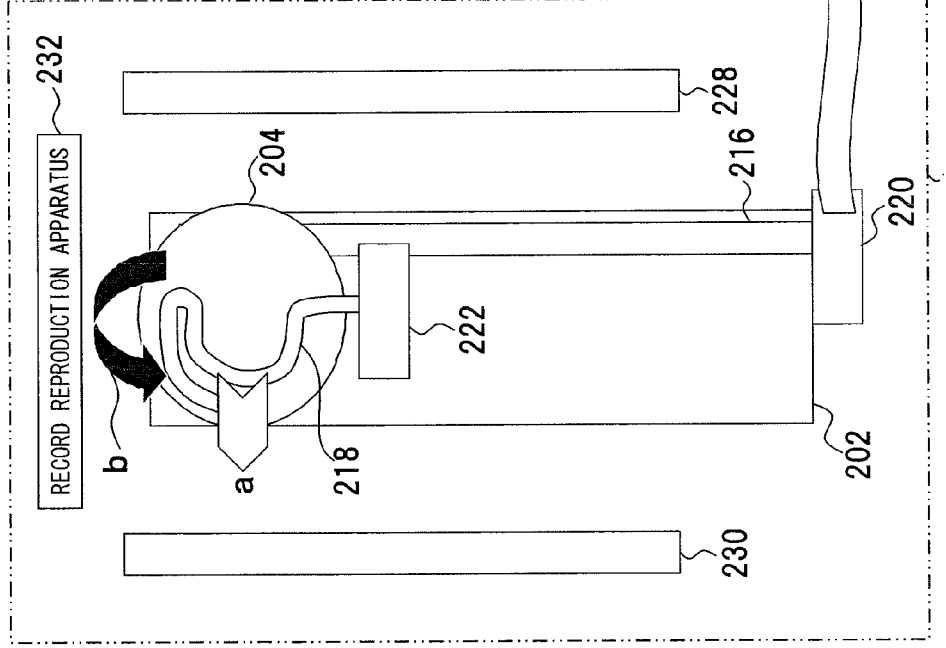

Description will be made of the operation of the medium transport mechanism unit and the behavior of the cable of the library apparatus including the cable carrying mechanism with reference to FIGS. 8 to 17. FIGS. 8, 9, and 10 show the operation when the medium gripping mechanism unit turns to the right medium shelf; FIGS. 11, 12, 13, and 14 show the operation when the medium gripping mechanism unit turns to the record reproduction apparatus; and FIGS. 15, 16, and 17 show the operation when the medium gripping mechanism unit turns to the left medium shelf. In FIGS. 8 to 17, the same symbols are added to the portions same as those of FIGS. 1 to 7.

(1) The Case of the Medium Gripping Mechanism Unit 24 Turning to the Direction of the Medium Shelf 10 (to the Right of the Figures)

The case of the medium gripping mechanism unit 24 turning to the direction of the medium shelf 10 is the operation when the picker arm units 56, 58 turn to the medium shelf 10 to deliver the recording medium 13 to/from the medium shelf 10, as shown in FIG. 8. In this case, as shown in FIGS. 9 and 10, the slide shaft 130 is moved toward the front end 118F of the cam groove 118 of the cam plate 64; a bending portion with a small curvature radius is generated near the moving end 112 of the cable bearer 36; and the cable 34 is bent with the largest curvature radius.

In this case, by moving the medium gripping mechanism unit 24 on the frame 68 in the direction of an arrow X, the medium gripping mechanism unit 24 can pick up the recording medium 13 from the medium shelf 10 or can return the recording medium 13 located at the picker arm units 56, 58 to the medium shelf 10.

(2) The Case of The Medium Gripping Mechanism Unit 24 Turning to the Direction of the Record Reproduction Apparatus 14 (to the Backside of the Figures)

Figure 11:
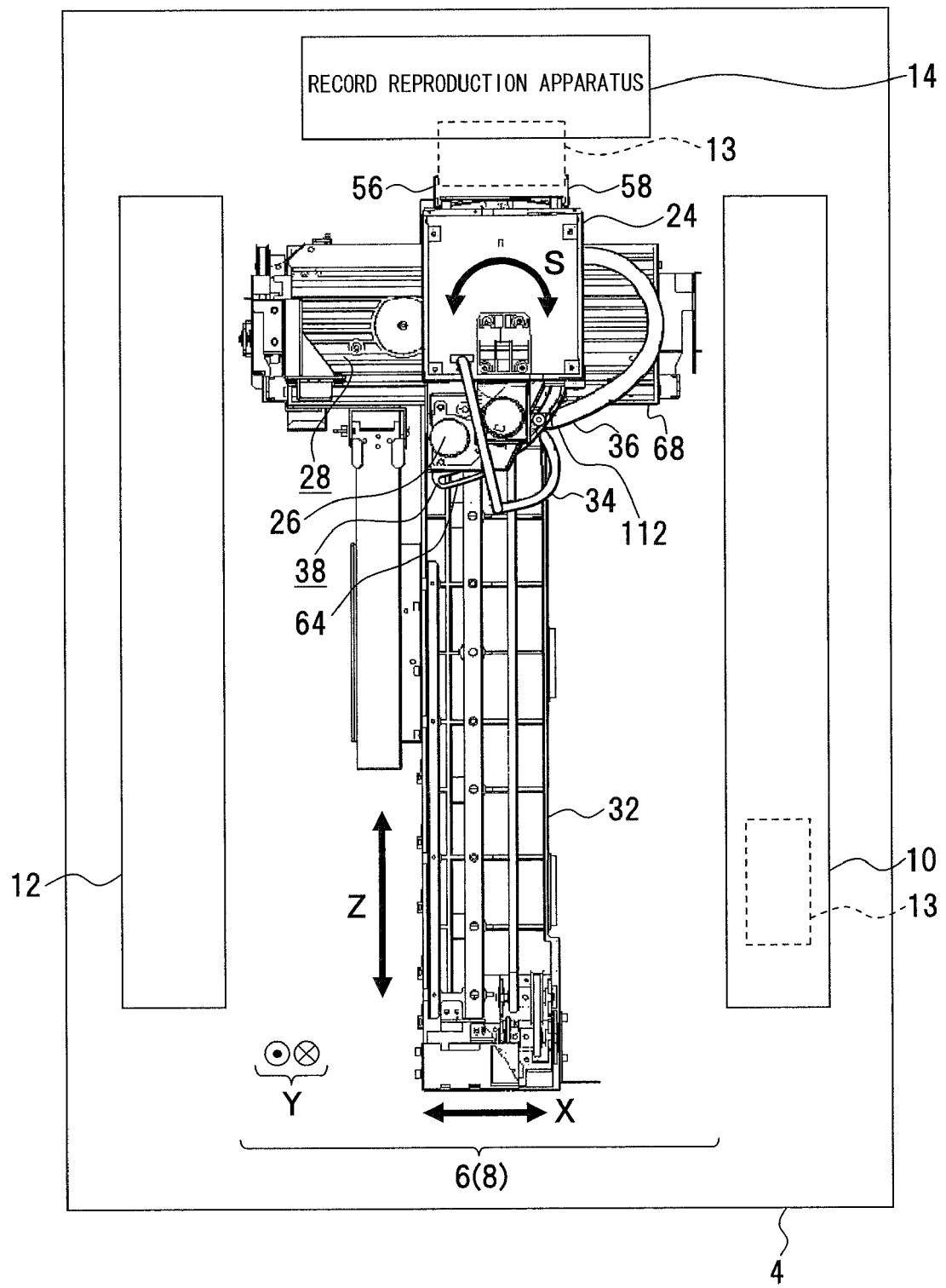
FIG. 11 shows a state of the medium gripping mechanism unit turning to the record reproduction apparatus.

The case of the medium gripping mechanism unit 24 turning to the direction of the record reproduction apparatus 14 is the operation when the picker arm units 56, 58 turn to the record reproduction apparatus 14 to deliver the recording medium 13 to/from the record reproduction apparatus 14, as shown in FIG. 11. This operation is caused both by transiting from the position shown in FIG. 8 and by transiting from the position shown in FIG. 15.

Figure 12:
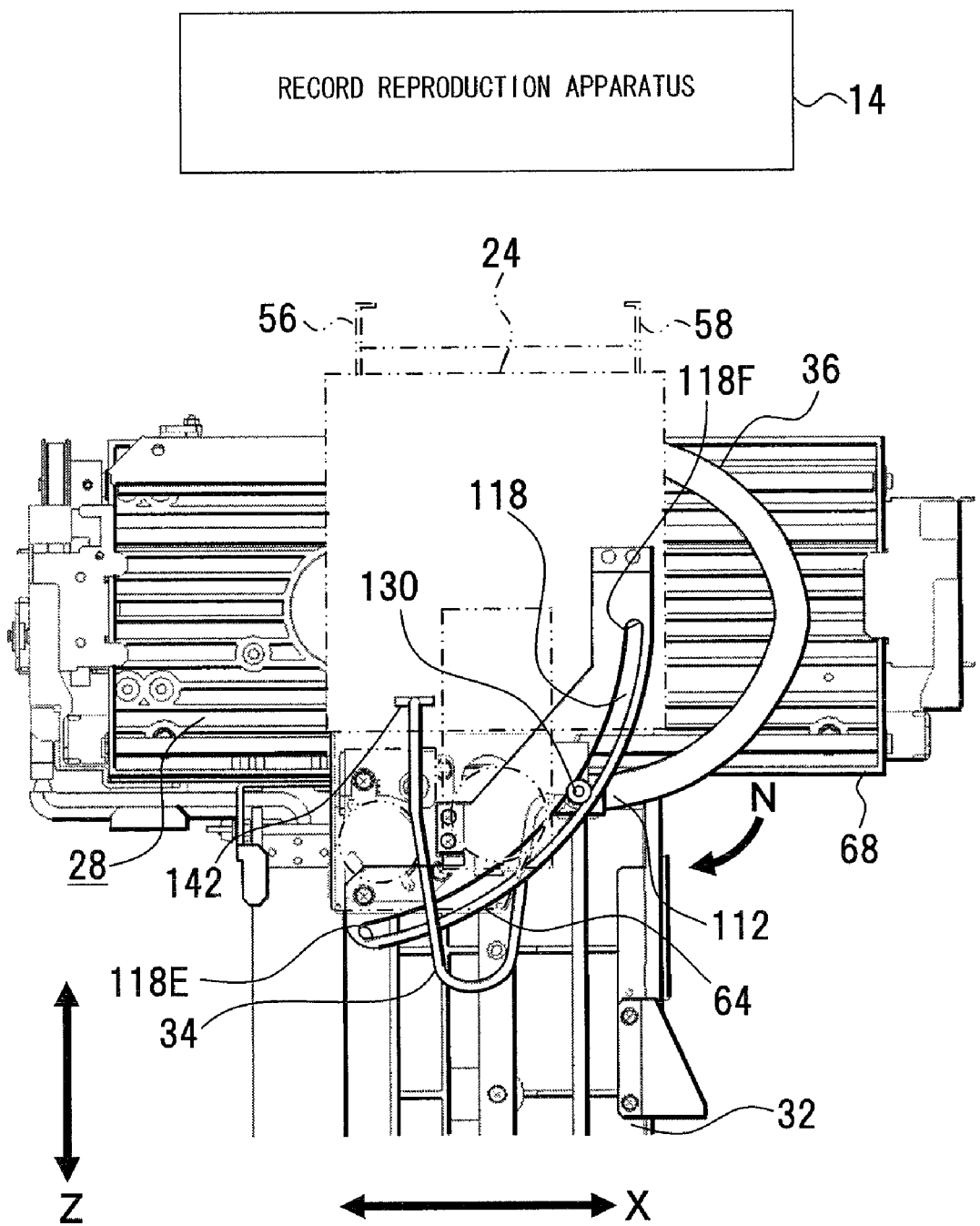
FIG. 12 shows behavior of the cable bearer and the cable when the medium gripping mechanism unit is turned to the record reproduction apparatus.

When the medium gripping mechanism unit 24 turns to the direction of the record reproduction apparatus 14, for example, the cam plate 64 shifts 90 degrees from the position shown in FIG. 8 along with the medium gripping mechanism unit 24. That is, as shown in FIGS. 12, 13, and 14, an angle of 90 degrees is formed by the frame 68 and the picker arm units 56, 58 of the medium gripping mechanism unit 24. FIG. 14 is a diagram of the picker arm units 56, 58 of the medium gripping mechanism unit 24 viewed from the record reproduction apparatus 14. In response to the rotation of the medium gripping mechanism unit 24, the slide shaft 130 attached to the moving end 112 of the cable bearer 36 turns to the direction opposite to the rotation direction of the medium gripping mechanism unit 24 (clockwise direction in the figures) along the cam groove 118 of the cam plate 64. That is, due to the rigidity of the cable bearer 36, the rotating motion is generated in the direction (an arrow N) opposite to the rotation direction of the medium gripping mechanism unit 24. As a result, the bending is prevented from exceeding an allowable curvature radius of the cable bearer 36, and the cable 34 in the cable bearer 36 is prevented from being bent excessively.

In this case, as shown in FIGS. 11 and 12, by moving (reciprocating) the medium gripping mechanism unit 24 along with the X-axis carrying mechanism unit 28 by the Z-axis carrying mechanism unit 32 in the direction of an arrow Z, the medium gripping mechanism unit 24 can pick up the recording medium 13 from the record reproduction apparatus 14 or can load the recording medium 13 located at the picker arm units 56, 58 into the record reproduction apparatus 14. In this case, the recording medium 13 may be picked up or loaded only by moving the picker arm units 56, 58 forward and backward.

(3) The Case of the Medium Gripping Mechanism Unit 24 Turning to the Direction of the Medium Shelf 12 (to the Left of the Figures)

The case of the medium gripping mechanism unit 24 turning to the direction of the medium shelf 12 is the operation when the picker arm units 56, 58 turn to the medium shelf 12 to deliver the recording medium 13 to/from the medium shelf 12, as shown in FIG. 15. In this case, as shown in FIGS. 16 and 17, the slide shaft 130 is moved toward the rear end 118E of the cam groove 118 of the cam plate 64; a bending portion with the largest curvature radius is generated near the moving end 112 of the cable bearer 36; and the cable 34 is bent with the smallest curvature radius.

In this case, by moving the medium gripping mechanism unit 24 on the frame 68 in the direction of an arrow X, the medium gripping mechanism unit 24 can pick up the recording medium 13 from the medium shelf 12 or can return the recording medium 13 located at the picker arm units 56, 58 to the medium shelf 12.

The Effects of the Aforementioned Embodiment Will be Listed and Described.

(1) The medium gripping mechanism unit 24 can carry the cable 34 following the 180-degree reciprocating swivel motion and can protect the cable 34 from the stress due to the carriage. That is, the concentration of the stress on the cable 34 can be avoided by the cable bearer 36 and the guide mechanism unit 38 and the disconnection and the stress on the connecting portion can be prevented to maintain the credibility of the electric system. As revealed by the above embodiment, since a relay printed board is not necessary and a cable width can be restrained, the reduction of the footprint can be achieved.

(2) Since the insertion of the cable 34 and the relay printed board are not necessary, the number of the assembly steps and the costs of the parts can be reduced. The credibility of the library apparatus can be improved by restraining generation of the disconnection during the assembly, the damage of the coating due to friction between cables during the rotating motion of the mechanism units, and the disconnection failure due to the bending.

(3) Since the cable 34 is not bent equal to or smaller than a minimum bending radius necessary for maintaining the safe state because the moving end 112 of the cable bearer 36 is moved along the cam groove 118 of the cam plate 64, the cable 34 is protected from the concentration of the stress to prevent the disconnection and the fatigue due to the bending.

(4) As described above, the damages of the cable can be prevented from occurring due to a mistake in the assembling work or the operation of the mechanism units; the credibility of the cable carriage can be maintained and the footprint can be reduced; and an inexpensive high quality product can be provided by restraining the costs of the parts.

OTHER EMBODIMENTS

Other embodiments of the cable carrying mechanism and the library apparatus will be listed.

(1) Although the library apparatus 2 has been illustrated as the embodiment of the cable carrying mechanism, since the cable carrying mechanism of the present invention protects the swivel cable 34 between the fixed unit and the movable unit that can swivel, the present invention can be applied to, for example, a robot provided with the fixed unit and the movable unit that can swivel and is not limited to the library apparatus 2.

(2) The swivel cable 34 of the above embodiment may be the FFC and the present invention is not limited by a type of a cable.

(3) Although the cartridge recording medium has been illustrated as the carried recording medium, the present invention can be applied when a recording medium other than the cartridge recording medium is used, and the present invention is not limited to the library apparatus using the cartridge recording medium.

(4) Although the cam plate 64 has been used with the guide mechanism unit 38 in the above embodiment, the movement may be guided by restricting the movement range with a roller provided on the guide rail unit.

(5) Although the cylindrical body in the shape of bellows has been illustrated as the cable bearer 36 in the above embodiment, the cable bearer 36 may be in the shape of a belt or ladder as long as a function for holding the cable 34 is provided.

(6) Although the timing belts and timing pulleys have been illustrated as the rotation transmitting units in the above embodiment, other rotation transmitting units may be used.

As set forth hereinabove, the present invention is suitable for the cable carrying mechanism provided along with the mechanism unit associated with mechanical displacement, such as a carrying mechanism that carries a cartridge recording medium, and the library apparatus with the cable carrying mechanism.

While the illustrative and presently preferred embodiments of the present invention have been described in detail herein, it is to be understood that the inventive concepts may be otherwise variously embodied and employed and that the appended claims are intended to be construed to include such variations except insofar as limited by the prior art.

What is claimed is:

1. A cable carrying mechanism comprising:
a cable carrying unit that is fixed at its one end to a support unit supporting a movable unit causing a positional displacement to carry a cable led by the movable unit while maintaining the cable bendably; and
a guide mechanism unit that is disposed in the movable unit, supports the other end of the cable carrying unit, and moves the other end of the cable carrying unit within a predetermined range correspondingly to the positional displacement caused to the movable unit, the guide mechanism unit guiding the movement of the other end of the cable carrying unit,
wherein in the cable carrying unit, the other end is moved by the guide mechanism unit due to the rotation or movement of the movable unit and a curvature radius changes.

2. The cable carrying mechanism of claim 1,
wherein the cable carrying unit includes a cover unit that holds the cable by the cable's penetrating.

3. The cable carrying mechanism of claim 1,
wherein the guide mechanism unit includes a sliding unit that is fixed to a moving end of the cable carrying unit and a guide rail unit that restricts the movement range of the sliding unit, the guide rail unit guiding a movement of the sliding unit.

4. The cable carrying mechanism of claim 1,
wherein the cable carrying unit has a length maintaining an extra length portion of the cable necessary for the rotation or movement of the movable unit.

5. The cable carrying mechanism of claim 1,
wherein the movable unit includes a power supplied unit that is connected to the cable to be supplied with electric power.

6. The cable carrying mechanism of claim 1,
wherein the cable carrying unit is constituted of a rigidity member.

7. The cable carrying mechanism of claim 1,
wherein the guide mechanism unit moves the other end of the cable carrying unit in a direction opposite to the positional displacement of the movable unit.

8. A library apparatus comprising:
a movable unit that causes a positional displacement;
a cable carrying unit that is fixed at its one end to a support unit supporting the movable unit to carry a cable led by the movable unit while maintaining the cable bendably; and
a guide mechanism unit that is disposed in the movable unit, supports the other end of the cable carrying unit, and moves the other end of the cable carrying unit within a predetermined range correspondingly to the positional displacement caused to the movable unit, the guide mechanism unit guiding the movement of the other end of the cable carrying unit, wherein in the cable carrying unit, the other end is moved by the guide mechanism unit due to the rotation or movement of the movable unit and a curvature radius changes.

9. The library apparatus of claim 8,
wherein the movable unit includes a gripping mechanism unit that grips a recording medium.

10. The library apparatus of claim 8,
wherein the movable unit is mounted on a rail unit that is disposed in a movement space located on the front side of a storage shelf storing a recording medium.

11. The library apparatus of claim 8,
wherein the cable carrying unit includes a cover unit that holds the cable by the cable's penetrating.

12. The library apparatus of claim 8,
wherein the cable carrying unit has a length maintaining an extra length portion of the cable necessary for the rotation or movement of the movable unit.

13. The library apparatus of claim 8, comprising:
a storage shelf that stores a recording medium;
a record reproduction apparatus that uses the recording medium to perform recording or reproducing;
a movement mechanism unit that moves with the movable unit mounted; and
a delivery mechanism unit that is disposed on the movable unit to deliver the recording medium to/from the storage shelf or the record reproduction apparatus.

14. The library apparatus of claim 8,
wherein the movable unit includes a power supplied unit that is connected to the cable to be supplied with electric power.

15. The library apparatus of claim 8,
wherein the cable carrying unit is constituted of a rigidity member.

16. The library apparatus of claim 8,
wherein the guide mechanism unit moves the other end of the cable carrying unit in a direction opposite to the positional displacement of the movable unit.

17. A library apparatus, comprising:
a movable unit that causes a positional displacement;
a cable carrying unit that is fixed at its one end to a support unit supporting the movable unit to carry a cable led by the movable unit while maintaining the cable bendably; and a guide mechanism unit that is disposed in the movable unit, slidably supports the other end of the cable carrying unit within a predetermined movement range, and moves the other end of the cable carrying unit within the movable range correspondingly to the positional displacement caused to the movable unit, the guide mechanism unit guiding the movement of the other end of the cable carrying unit within the movable range, wherein the movable unit is rotated by a rotating mechanism of a main body of the apparatus.

18. The library apparatus of claim 8,
wherein the movable unit includes a gripping mechanism unit that grips a recording medium.

19. The library apparatus of claim 17,
wherein the movable unit is mounted on a rail unit that is disposed in a movement space located on the front side of a storage shelf storing a recording medium.

20. The library apparatus of claim 17,
wherein the cable carrying unit includes a cover unit that holds the cable by the cable's penetrating.

21. The library apparatus of claim 17,
wherein the cable carrying unit has a length maintaining an extra length portion of the cable necessary for the rotation or movement of the movable unit.

22. The library apparatus of claim 17, comprising:
a storage shelf that stores a recording medium;
a record reproduction apparatus that uses the recording medium to perform recording or reproducing;
a movement mechanism unit that moves with the movable unit mounted; and
a delivery mechanism unit that is disposed on the movable unit to deliver the recording medium to/from the storage shelf or the record reproduction apparatus.

23. The library apparatus of claim 17,
wherein the movable unit includes a power supplied unit that is connected to the cable to be supplied with electric power.

24. The library apparatus of claim 17,
wherein the cable carrying unit is constituted of a rigidity member.

25. The library apparatus of claim 17,
wherein the guide mechanism unit moves the other end of the cable carrying unit in a direction opposite to the positional displacement of the movable unit.

* * * * *

UNITED STATES PATENT AND TRADEMARK OFFICE
CERTIFICATE OF CORRECTION

PATENT NO.       : 7,764,461 B2
APPLICATION NO.  : 11/277826
DATED            : July 27, 2010
INVENTOR(S)      : Tsukasa Minemura It is certified that error appears in the above-identified patent and that said Letters Patent is hereby corrected as shown below:

Column 13, Line 42 in Claim 17, delete "apparatus," and insert --apparatus--, therefor.

Column 14, Line 11 in Claim 18, delete "claim 8," and insert --claim 17,--, therefor.

Signed and Sealed this
Twenty-eighth Day of December, 2010

David J. Kappos
*Director of the United States Patent and Trademark Office*